United States Patent
Jiang et al.

(10) Patent No.: US 12,513,763 B2
(45) Date of Patent: Dec. 30, 2025

(54) METHOD AND DEVICE IN A NODE FOR A TIME INTERVAL AND AN ACCESS PROCEDURE IN WIRELESS COMMUNICATION

(71) Applicant: Apogee Networks, LLC, Plano, TX (US)

(72) Inventors: Qi Jiang, Shanghai (CN); Xiaobo Zhang, Shanghai (CN)

(73) Assignee: Apogee Networks, LLC, Plano, TX (US)

(*) Notice: Subject to any disclaimer, the term of this patent is extended or adjusted under 35 U.S.C. 154(b) by 490 days.

(21) Appl. No.: 17/974,547

(22) Filed: Oct. 27, 2022

(65) Prior Publication Data

US 2023/0045918 A1    Feb. 16, 2023

Related U.S. Application Data

(63) Continuation of application No. PCT/CN2021/093478, filed on May 13, 2021.

(30) Foreign Application Priority Data

May 13, 2020  (CN) .......................... 202010401057.8
May 20, 2020  (CN) .......................... 202010428699.7

(51) Int. Cl.
  *H04W 76/19*    (2018.01)
  *H04W 76/27*    (2018.01)
(52) U.S. Cl.
  CPC ........... *H04W 76/19* (2018.02); *H04W 76/27* (2018.02)
(58) Field of Classification Search
  CPC ...... H04W 84/06; H04W 76/19; H04W 76/27
  See application file for complete search history.

(56) References Cited

U.S. PATENT DOCUMENTS

| 11,064,478 B2 | 7/2021 | Jiang et al. |
| 11,424,882 B2 | 8/2022 | Wu et al. |
| (Continued) | | |

FOREIGN PATENT DOCUMENTS

| CN | 109923920 A | 6/2019 |
| CN | 110475380 A | 11/2019 |
| (Continued) | | |

OTHER PUBLICATIONS

ISR received in application No. PCT/CN2021/093478 dated Sep. 13, 2021.

(Continued)

*Primary Examiner* — Congvan Tran
(74) *Attorney, Agent, or Firm* — VOLPE KOENIG

(57) ABSTRACT

Disclosure discloses a method and a device in a node used for wireless communications. A node first receives first information, and then transmits a first signal and triggers a first timer, the first timer is expired and triggers a first procedure; the first information is used to determine a first time interval length; the first timer is started in a first time window, the first time window comprising a positive integer number of slots; a time interval between an end time of transmission of the first signal and a start of the first time window is equal to the first time interval length; the first procedure is related to the type of the first timer. By associating a start time of timing of the first timer with the first time interval length, the present disclosure optimizes the RRM and/or RLM timer design in NTN, thus improving the overall performance.

20 Claims, 7 Drawing Sheets

(56) References Cited

U.S. PATENT DOCUMENTS

| | | | |
|---|---|---|---|
| 2011/0292893 A1* | 12/2011 | Lee | H04W 4/08 370/329 |
| 2013/0183974 A1 | 7/2013 | Johansson | |
| 2016/0338137 A1 | 11/2016 | Mishra | |
| 2020/0359386 A1 | 11/2020 | Liu | |
| 2022/0287130 A1* | 9/2022 | He | H04W 76/19 |
| 2023/0262540 A1* | 8/2023 | Kim | H04W 36/362 370/216 |
| 2023/0328700 A1* | 10/2023 | Chen | H04W 76/20 |
| 2025/0142637 A1* | 5/2025 | Qiu | H04W 74/085 |

FOREIGN PATENT DOCUMENTS

| | | | |
|---|---|---|---|
| WO | 2018082415 A1 | 5/2018 | |
| WO | 2019149050 A1 | 8/2019 | |
| WO | 2019165224 A1 | 8/2019 | |
| WO | 2020069135 A2 | 4/2020 | |

OTHER PUBLICATIONS

First Office Action of Chinses patent application No. CN202010401057.8 dated Jul. 1, 2022.

First Search Report of Chinses patent application No. CN202010401057.8 dated Jun. 24, 2022.

Notification to Grant Patent Right for Invention of Chinses patent application No. CN202010401057.8 dated Nov. 18, 2022.

ZTE, Sanechips Remaining issues of 2-step RACH procedures 3GPP TSG RAN WG1 Meeting #98bis R1-1910003 Oct. 4, 2019.

Huawei, HiSilicon Discussion on timing advance and RACH procedures for NTN 3GPP TSG RAN WG1 Meeting #96bis R1-1904000 Mar. 30, 2019.

Third Generation Partnership Project, "Technical Specification Group Radio Access Network; NR; Physical channels and modulation (Release 16)," 3GPP TS 38.211 V16.1.0 (Mar. 2020).

Third Generation Partnership Project, "Technical Specification Group Radio Access Network; NR; Physical layer procedures for data (Release 16)," 3GPP TS 38.214 V16.1.0 (Mar. 2020).

Third Generation Partnership Project, "Technical Specification Group Radio Access Network; NR; Medium Access Control (MAC) protocol specification (Release 16)," 3GPP TS 38.321 V16.0.0 (Mar. 2020).

Third Generation Partnership Project, "Technical Specification Group Radio Access Network; NR; Radio Resource Control (RRC) protocol specification (Release 16)," 3GPP TS 38.331 V16.0.0 (Mar. 2020).

* cited by examiner

METHOD AND DEVICE IN A NODE FOR A TIME INTERVAL AND AN ACCESS PROCEDURE IN WIRELESS COMMUNICATION

CROSS REFERENCE TO RELATED APPLICATIONS

This application is a continuation of International Application No. PCT/CN2021/093478, filed May 13, 2021, which claims the priority benefit of Chinese Patent Application No. 202010401057.8, filed on May 13, 2020, and claims the priority benefit of Chinese Patent Application No. 202010428699.7, filed on May 20, 2020 the full disclosure of which is incorporated herein by reference.

BACKGROUND

Technical Field

The present disclosure relates to transmission methods and devices in wireless communication systems, and in particular to the design of a timer in Radio Resource Management (RRM) or Radio Link Monitoring (RLM) procedure, as well as a corresponding method and device for radio signal transmission.

Related Art

In a 5G system, a variety of timers have been defined to ensure operations of an RLM or an RRM procedure, for example, as provided in the Technical Specification (TS) 38.331, a T304 is used for procedures relevant to Radio Resource Control (RRC) reconfiguration, or, a T312 is used for procedures relevant to measurement report submission and handover of a corresponding cell, however, the above timers are generally designed for application scenarios of Terrestrial Network (TN), in which there isn't any large transmission delay in existence. At the 3GPP RAN #75 plenary meetings, a study item (SI) of Non-Terrestrial Networks (NTN) over NR was approved, which starts with R15 and proceeds in the subsequent R17 where a WI is initiated to standardize relevant techniques. In view of NTN scenarios, the above timer designs shall be optimized in another way.

SUMMARY

In NTN scenario, a Round Trip Time (RTT) is required to be introduced in an interaction between a terminal and a base station. Compared with TN, satellites orbiting at higher altitude, such as a Geostationary Earth Orbiting (GEO) satellite, may be deferred by a transmission latency of up to dozens of milliseconds, which in turn will cause great impact on the time counting of a timer, and then influences the timer's design. A solution put forward to address the issue is to increase the expiration term for the existing timers in RRM and RLM, but that will raise another issue of unnecessary power consumption.

Targeting the application scenarios and requirements of NTN, the present disclosure provides a solution. It should be noted that if no conflict is incurred, embodiments in a first node in the present disclosure and the characteristics of the embodiments are also applicable to a base station, and embodiments in a second node in the present disclosure and the characteristics of the embodiments are also applicable to a terminal. Meanwhile, the embodiments in the present disclosure and the characteristics in the embodiments can be arbitrarily combined if there is no conflict.

Furthermore, although originally targeted at scenarios with larger transmission delay, the present disclosure is also applicable to scenarios with normal transmission delay, and, although originally targeted at terminal-base station scenarios, the present disclosure is also applicable to inter-terminal scenarios and radio signal transmissions between terminal and other communication nodes, where technical effects similar to those in the terminal-base station scenario will be achieved. Additionally, the adoption of a unified solution for various scenarios (including but not limited to terminal-base station communications) contributes to the reduction of hardcore complexity and costs.

The present disclosure provides a method in a first node for wireless communications, comprising:
  receiving first information;
  transmitting a first signal and triggering a first timer; and
  determining that a first timer is expired and triggering a first procedure;
  herein, the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, a technical feature of the above method lies in that when the first timer is triggered by the first signal, a start time for timing of the first timer is deferred by the first time interval length, which ensures that an RTT between a terminal and a base station is not counted by the first timer, thus optimizing the timer design.

In one embodiment, another technical feature of the above method lies in that the first node does not need to monitor any feedback from a base station in a time resource corresponding to the first time interval length, thus reducing power consumption and the false detection rate.

According to one aspect of the present disclosure, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, a technical feature of the above method lies in that at least one factor of the type, the altitude, the running speed or the running direction of the transmitter of the first information is used to determine the first time interval length, thus guaranteeing the accuracy of the first time interval length.

In one embodiment, another technical feature of the above method lies in that an implicit correlation is created between the first time interval length and the first parameter group, so there is no need for an explicit signaling indication, thereby reducing the signaling overhead.

According to one aspect of the present disclosure, comprising:
  monitoring a second signal during running of the first timer;
  herein, the first node successfully receives the second signal during the running of the first timer, and then the first timer stops running; or the first node does not receive the second signal successfully before expiration of the first timer, and the first node triggers the first procedure.

According to one aspect of the present disclosure, the first timer is T312, and the first signal comprises a measurement report; the first procedure includes one of entering RRC_IDLE state, initiating connection reestablishment, or initiating Secondary Cell Group (SCG)-failure information.

According to one aspect of the present disclosure, the first timer is T316, and the first signal comprises a message of Master Cell Group (MCG) failure information; the first procedure includes initiating connection reestablishment.

According to one aspect of the present disclosure, the first timer is T300, and the first signal comprises an RRC setup request; the first procedure includes resetting MAC.

According to one aspect of the present disclosure, the first timer is T301, and the first signal comprises an RRC reestablishment request; the first procedure includes entering RRC_IDLE.

According to one aspect of the present disclosure, when a first condition is fulfilled in the first time window, the first node stops the first timer; or, when the first condition is not fulfilled in the first time window, the first node keeps counting of the first timer; when the first timer is T312, the first condition comprises one of the first node initiating connection reestablishment, T310 of a SpCell being expired or an SCG being released; when the first timer is T316, the first condition comprises the first node initiating connection reestablishment; when the first timer is T300, the first condition comprises a higher layer dropping connection reestablishment.

According to one aspect of the present disclosure, the phrase that the first timer is expired includes a meaning that a running period of the first timer reaches a first threshold, the first threshold being a positive integer, and the first threshold being measured in milliseconds (ms), and the first information is used to determine the first threshold.

In one embodiment, a technical feature of the above method lies in that the expiration term for the first timer is also related to the first information, which further optimizes the first timer's design according to physical information about the transmitter of the first information.

The present disclosure provides a method in a second node for wireless communications, comprising:

transmitting first information; and receiving a first signal;

herein, a transmitter of the first signal is a first node, and the first signal is used to trigger a first timer for the first node; when the first timer is expired, the first node triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

According to one aspect of the present disclosure, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

According to one aspect of the present disclosure, comprising:

transmitting a second signal;

herein, a transmitter of the first signal is a first node, the first node monitoring a second signal during running of the first timer; the first node successfully receives the second signal during the running of the first timer, and then the first timer stops running.

According to one aspect of the present disclosure, comprising:

dropping transmitting a second signal;

herein, a transmitter of the first signal is a first node, the first node monitoring a second signal during running of the first timer; the first node does not receive the second signal successfully before expiration of the first timer, and the first node triggers the first procedure.

According to one aspect of the present disclosure, the first timer is T312, and the first signal comprises a measurement report; the first procedure includes one of entering RRC_IDLE state, initiating connection reestablishment, or initiating Secondary Cell Group (SCG)-failure information.

According to one aspect of the present disclosure, the first timer is T316, and the first signal comprises a message of MCG failure information; the first procedure includes initiating connection reestablishment.

According to one aspect of the present disclosure, the first timer is T300, and the first signal comprises an RRC setup request; the first procedure includes resetting MAC.

According to one aspect of the present disclosure, the first timer is T301, and the first signal comprises an RRC reestablishment request; the first procedure includes entering RRC_IDLE state.

According to one aspect of the present disclosure, a transmitter of the first signal is a first node; when a first condition is fulfilled in the first time window, the first node stops the first timer; or, when the first condition is not fulfilled in the first time window, the first node keeps counting of the first timer; when the first timer is T312, the first condition comprises one of the first node initiating connection reestablishment, T310 of a SpCell being expired or an SCG being released; when the first timer is T316, the first condition comprises the first node initiating connection reestablishment; when the first timer is T300, the first condition comprises a higher layer dropping connection reestablishment.

According to one aspect of the present disclosure, the phrase that the first timer is expired includes a meaning that a running period of the first timer reaches a first threshold, the first threshold being a positive integer, and the first threshold being measured in milliseconds (ms), and the first information is used to determine the first threshold.

The present disclosure provides a first node for wireless communications, comprising:

a first receiver, receiving first information;

a first transceiver, transmitting a first signal and triggering a first timer; and a second transceiver, determining that the first timer is expired and triggering a first procedure;

herein, the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

The present disclosure provides a second node for wireless communications, comprising:

a first transmitter, transmitting first information; and
a third transceiver, receiving a first signal;
herein, a transmitter of the first signal is a first node, and the first signal is used to trigger a first timer for the first node; when the first timer is expired, the first node triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

The present disclosure provides a method in a first node for wireless communications, comprising:

receiving first information;
receiving a first signal and triggering a first timer; and
determining that the first timer is expired and triggering a first procedure;
herein, the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, a technical feature of the above method lies in that the first timer is counted only in K1 first-type time windows, so as to ensure that the first timer is used for multiple interactions between the first node and a base station, and transmission delay resulting from the multiple interactions won't be counted in the timing of the first timer, thus guaranteeing the accuracy of the timing of the first timer.

According to one aspect of the present disclosure, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, a technical feature of the above method lies in that at least one factor of the type, the altitude, the running speed or the running direction of the transmitter of the first information is used to determine the first time interval length, thus guaranteeing the accuracy of the first time interval length.

In one embodiment, another technical feature of the above method lies in that an implicit correlation is created between the first time interval length and the first parameter group, so there is no need for an explicit signaling indication, thereby reducing the signaling overhead.

According to one aspect of the present disclosure, the first timer is T304; the first signal comprises RRCReconfiguration with reconfigurationWithSync, or the first signal comprises Conditional Reconfiguration Execution; the first procedure includes one of initiating RRC reestablishment, reference source Radio Access Technology (RAT) protocols implementation or initiating SCG-failure information.

According to one aspect of the present disclosure, the first timer is T316, and the first signal comprises a message of MCG failure information; the first procedure includes initiating connection reestablishment.

According to one aspect of the present disclosure, comprising:

monitoring a second signal during running of the first timer;
herein, the first node successfully receives the second signal during the running of the first timer, and then the first timer stops running; or the first node does not receive the second signal successfully before expiration of the first timer, and the first node triggers the first procedure.

According to one aspect of the present disclosure, when a first condition is fulfilled in the first time resource set, the first transceiver stops the first timer; or, when the first condition is not fulfilled in the first time resource set, the first transceiver keeps counting of the first timer; when the first timer is T304, the first condition includes the first node successfully completing random access, or the first condition includes an SCG being released; when the first timer is T316, the first condition includes the first node initiating connection reestablishment.

According to one aspect of the present disclosure, comprising:

transmitting K1 second-type signals respectively in K1 second-type time windows; and
receiving K1 first-type signals respectively in the K1 first-type time windows;
herein, the K1 second-type time windows respectively correspond to the K1 first-type time windows, and the K1 first-type signals are respectively used for feedbacks of the K1 second-type signals; at least one of the K1 second-type signals is used for random access, and at least one of the K1 first-type signals is used for feedback of random access.

In one embodiment, a technical feature of the above method lies in that the first node only operates in the K1 second-type time windows and the K1 first-type time windows, which reduces power consumption and increases standby time.

According to one aspect of the present disclosure, the phrase that the first timer is expired includes a meaning that a running period of the first timer reaches a first threshold, the first threshold being a positive integer, and the first threshold being measured in milliseconds (ms), and the first information is used to determine the first threshold.

In one embodiment, a technical feature of the above method lies in that the expiration term for the first timer is also related to the first information, which further optimizes the first timer's design according to physical information about the transmitter of the first information.

According to one aspect of the present disclosure, radio link monitoring is not performed during a time interval between an end time of reception of the first signal and a start time of the first time resource set.

The present disclosure provides a method in a second node for wireless communications, comprising:

transmitting first information; and
transmitting a first signal;
herein, a receiver of the first information includes a first node, and the first signal is used for initiating a first timer of the first node; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

According to one aspect of the present disclosure, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

According to one aspect of the present disclosure, the first timer is T304; the first signal comprises RRCReconfiguration with reconfigurationWithSync, or the first signal comprises Conditional Reconfiguration Execution; the first procedure includes one of initiating RRC reestablishment, reference source RAT protocols implementation or initiating SCG-failure information.

According to one aspect of the present disclosure, the first timer is T316, and the first signal comprises a message of MCG failure information; the first procedure includes initiating connection reestablishment.

According to one aspect of the present disclosure, comprising:

transmitting a second signal;

herein, a receiver of the first signal includes a first node, and the first node monitors a second signal during running of the first timer; the first node successfully receives the second signal during the running of the first timer, and then the first timer stops running.

According to one aspect of the present disclosure, comprising:

dropping transmitting a second signal;

herein, a receiver of the first signal includes a first node, and the first node monitors a second signal during running of the first timer; the first node does not receive the second signal successfully before expiration of the first timer, and the first node triggers the first procedure.

According to one aspect of the present disclosure, a receiver of the first signal includes a first node, when a first condition is fulfilled in the first time resource set, the first node stops the first timer; or, when a first condition is not fulfilled in the first time resource set, the first node keeps counting of the first timer; when the first timer is T304, the first condition includes the first node successfully completing random access, or the first condition includes an SCG being released; when the first timer is T316, the first condition includes the first node initiating connection reestablishment.

According to one aspect of the present disclosure, comprising:

receiving K1 second-type signals respectively in K1 second-type time windows; and transmitting K1 first-type signals respectively in the K1 first-type time windows;

herein, the K1 second-type time windows respectively correspond to the K1 first-type time windows, and the K1 first-type signals are respectively used for feedbacks of the K1 second-type signals; at least one of the K1 second-type signals is used for random access, and at least one of the K1 first-type signals is used for feedback of random access.

According to one aspect of the present disclosure, the phrase that the first timer is expired includes a meaning that a running period of the first timer reaches a first threshold, the first threshold being a positive integer, and the first threshold being measured in milliseconds (ms), and the first information is used to determine the first threshold.

According to one aspect of the present disclosure, a receiver of the first signal includes a first node, and the first node does not perform radio link monitoring during a time interval between an end time of reception of the first signal and a start time of the first time resource set.

The present disclosure provides a first node for wireless communications, comprising:

a first receiver, receiving first information;

a first transceiver, receiving a first signal and triggering a first timer; and a second transceiver, determining that the first timer is expired and triggering a first procedure;

herein, the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

The present disclosure provides a second node for wireless communications, comprising:

a first transmitter, transmitting first information; and a third transceiver, transmitting a first signal;

herein, a receiver of the first information includes a first node, and the first signal is used for initiating a first timer of the first node; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the present disclosure is advantageous over the prior art in the following aspects:

When the first timer is triggered by the first signal, the start time of timing of the first timer is deferred by the first time interval length, so that the RTT between a terminal and a base station is not counted in the first timer, thereby optimizing the timer design.

The first node is not required to monitor feedbacks from the base station in a time resource corresponding to the first time interval length, thus reducing power consumption and the false detection rate.

At least one factor of the type, altitude, running speed or running direction of the transmitter of the first information is used for determining the first time interval length, which in turn guarantees the accuracy of the first time interval length.

An implicit association is created between the first time interval length and the first parameter group, so there is no need for explicit signaling indication, which reduces the signaling overhead.

In one embodiment, the present disclosure is advantageous over the prior art in the following aspects:

The first timer is only counted in K1 first-type time windows, thus ensuring that when the first timer is used for multiple interactions between the first node and the base station, transmission delay incurred by these multiple interactions won't be counted into the timing of the first timer, which in turn guarantees the accuracy of the timing of the first timer.

At least one factor of the type, altitude, running speed or running direction of the transmitter of the first information is used for determining the first time interval length, which in turn guarantees the accuracy of the first time interval length.

An implicit correlation is created between the first time interval length and the first parameter group, so there is no need for an explicit signaling indication, thereby reducing the signaling overhead.

The expiration term for the first timer is also related to the first information, which further optimizes the first timer's design according to physical information about the transmitter of the first information.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1A

Figure 1A:
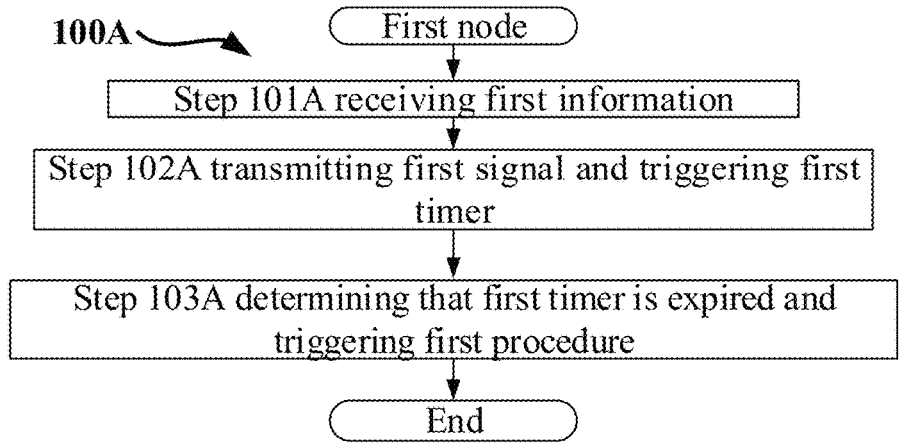
FIG. 1A illustrates a flowchart of processing of a first node according to one embodiment of the present disclosure.

Embodiment 1A illustrates a flowchart of a first signaling and a first radio signal, as shown in FIG. 1A. In 100 illustrated by FIG. 1A, each box represents a step. In Embodiment 1A, a first node in the present disclosure first receives first information in step 101A; and then transmits a first signal and triggers a first timer in step 102A; and determines that the first timer is expired and triggers a first procedure in step 103A.

In Embodiment 1A, the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first information is an RRC signaling.

In one embodiment, the first information is Cell-Specific.

In one embodiment, the first information is Beam Spot-specific.

In one embodiment, the first information is antenna port-specific.

In one embodiment, the first information is Area Specific.

In one embodiment, the first information is a broadcast signaling.

In one embodiment, the first information belongs to an SS/PBCH Block (SSB).

In one embodiment, the first information belongs to a System Information Block (SIB).

In one embodiment, the first information comprises an SSB.

In one embodiment, the first information comprises an SIB.

In one embodiment, the first information comprises at least one of a Primary Synchronization Signal (PSS) or a Secondary Synchronization Signal (SSS).

In one embodiment, the first signal is a physical layer signal.

In one embodiment, the first signal is a baseband signal.

In one embodiment, the first signal is a higher layer signal.

In one embodiment, the first signal comprises an RRC signaling.

In one embodiment, the phrase of transmitting a first signal and triggering a first timer includes a meaning that when the first node begins to transmit the first signal, the first timer is triggered.

In one embodiment, the phrase of transmitting a first signal and triggering a first timer includes a meaning that when the first node completes transmission of the first signal, the first timer is triggered.

In one embodiment, the phrase of transmitting a first signal and triggering a first timer includes a meaning that only when the first node completes transmission of the first signal can the first timer start timing.

In one embodiment, the phrase of transmitting a first signal and triggering a first timer includes a meaning that the first node completes transmission of the first signal in an N-th slot, and the moment at which the first timer starts timing is no earlier than an (N+1)-th slot, N being a non-negative integer.

In one embodiment, the phrase of transmitting a first signal and triggering a first timer includes a meaning that as the first node transmits the first signal, the first timer starts timing.

In one embodiment, the phrase of the first timer being expired and triggering a first procedure includes a meaning that time accumulation of the first timer exceeds a first threshold, and the first node triggers the first procedure.

In one embodiment, the first time interval length is equal to T1 milliseconds, T1 being a real number greater than 1.

In one embodiment, the first time interval length is equal to T1 milliseconds, T1 being a positive integer number greater than 1.

In one embodiment, time resources comprised by the first time interval length are continuous.

In one embodiment, the phrase that the first timer is started in a first time window includes a meaning that the first timer starts time counting at the start of the first time window.

In one embodiment, the phrase that the first timer is started in a first time window includes a meaning that the first timer only counts time in the first time window.

In one embodiment, a second node in the present disclosure transmits the first information.

In one embodiment, the first time interval length is related to a transmission delay between the second node and the first node.

In one embodiment, the first time interval length is related to a Round Trip Time (RTT) between the second node and the first node.

In one embodiment, the first time interval length is related to an altitude of the second node.

In one embodiment, the first time interval length is related to a distance from the second node to a perigee of the second node.

In one embodiment, the first time interval length is related to an uplink Timing Advance (TA) between the first node and the second node.

In one embodiment, the first time interval length is related to an inclination angle of the first node to the second node.

In one embodiment, the first time interval length is equal to a sum of T1 milliseconds and T2 milliseconds, T1 and T2 both being non-negative real numbers.

In one subembodiment, T1 milliseconds is equal to the RTT from the first node to the second node.

In one subembodiment, T1 milliseconds equals twice the length of a transmission delay from the second node to the perigee of the second node.

In one subembodiment, T2 is fixed.

In one subembodiment, T2 is configured by a higher layer signaling.

In one subembodiment, T2 is equal to duration of 4 contiguous slots.

In one subembodiment, T2 is equal to 0.

In one subembodiment, T2 is related to the second node's processing capability.

In one embodiment, the phrase that the first procedure is related to a type of the first timer includes a meaning that the first procedure is one of K1 candidate procedures, and the first timer is one of K1 candidate timers, the K1 candidate procedures respectively corresponding to the K1 candidate timers, and the first timer is used for determining the first procedure corresponding to the first timer out of the K1 candidate procedures.

In one embodiment, the first timer is used for updating a wireless connection, the first timer including an RRC timer.

In one embodiment, the first timer is T300 in TS 38.331.
In one embodiment, the first timer is T301 in TS 38.331.
In one embodiment, the first timer is T302 in TS 38.331.
In one embodiment, the first timer is T304 in TS 38.331.
In one embodiment, the first timer is T310 in TS 38.331.
In one embodiment, the first timer is T311 in TS 38.331.
In one embodiment, the first timer is T312 in TS 38.331.
In one embodiment, the first timer is T316 in TS 38.331.
In one embodiment, the first timer is T319 in TS 38.331.

In one embodiment, when the first timer is expired, the first node operates the first procedure.

In one embodiment, when the first timer is not yet expired, the first node does not operate the first procedure.

In one embodiment, the first node is a terminal in Narrowband Internet of Things (NB-IOT).

In one embodiment, the first node is a power-limited terminal.

Embodiment 1B

Figure 1B:
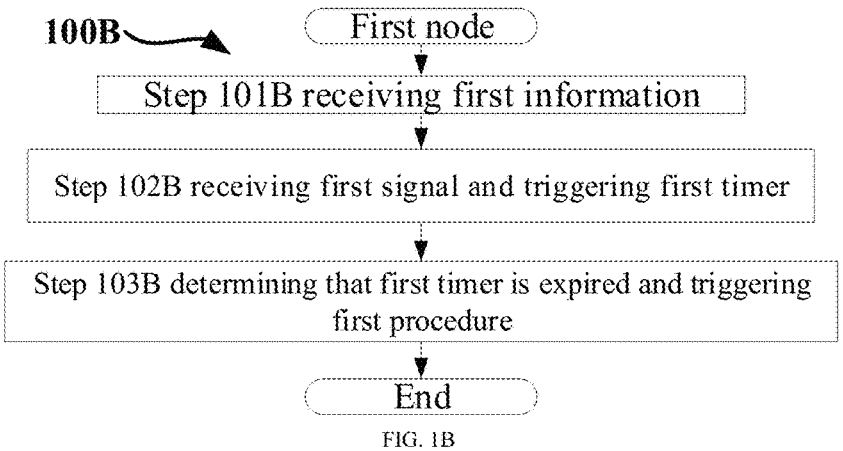
FIG. 1B illustrates a flowchart of processing of a first node according to one embodiment of the present disclosure.

Embodiment 1B illustrates a flowchart of processing of a first node, as shown in FIG. 1B. In 100B illustrated in FIG. 1B, each box represents a step. In Embodiment 1B, the first node in the present disclosure first receives first information in step 101B, and then receives a first signal and triggers a first timer in step 102B, and determines that the first timer is expired and triggers a first procedure in step 103B.

In Embodiment 1B, the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the first information is an RRC signaling.

In one embodiment, the first information is Cell-Specific.

In one embodiment, the first information is Beam Spot-specific.

In one embodiment, the first information is antenna port-specific.

In one embodiment, the first information is antenna-port group-specific.

In one embodiment, the first information is specific to Channel State Information Reference Signal (CSI-RS) resource.

In one embodiment, the first information is SS/PBCH Block-specific (SSB-specific).

In one embodiment, the first information is Area Specific.

In one embodiment, the first information is a broadcast signaling.

In one embodiment, the first information belongs to an SSB.

In one embodiment, the first information belongs to a System Information Block (SIB).

In one embodiment, the first information comprises an SSB.

In one embodiment, the first information comprises broadcasting information.

In one embodiment, the first information comprises at least one of a Primary Synchronization Signal (PSS) or a Secondary Synchronization Signal (SSS).

In one embodiment, the first signal is a physical layer signal.

In one embodiment, the first signal is a baseband signal.

In one embodiment, the first signal is a higher layer signal.

In one embodiment, the first signal comprises an RRC signaling.

In one embodiment, the phrase of receiving a first signal and triggering a first timer includes a meaning that the first timer is triggered when the first node begins to receive the first signal.

In one embodiment, the phrase of receiving a first signal and triggering a first timer includes a meaning that the first timer is triggered when the first node completes reception of the first signal.

In one embodiment, the phrase of receiving a first signal and triggering a first timer includes a meaning that only when the first node completes reception of the first signal can the first timer start timing.

In one embodiment, the phrase of receiving a first signal and triggering a first timer includes a meaning that the first timer starts timing as the first node receives the first signal.

In one embodiment, the phrase of the first timer being expired and triggering a first procedure includes a meaning that time accumulation of the first timer exceeds a first threshold, and the first node triggers the first procedure.

In one embodiment, the K1 first-type time windows are discrete in time domain.

In one embodiment, any of the K1 first-type time windows comprises a positive integer number of (more than one) contiguous slots.

In one embodiment, the K1 first-type time windows and K2 first-type time intervals alternately occur in time domain, K2 being a positive integer and equal to K1 minus 1.

In one subembodiment, any of the K2 first-type time intervals is of a duration no smaller than the first time interval length in time domain.

In one subembodiment, at least two first-type time intervals of the K2 first-type time intervals are of different durations in time domain.

In one subembodiment, the phrase that the K1 first-type time windows and K2 first-type time intervals alternately occur in time domain includes a meaning that there is one of the K2 first-type time intervals between any two time-domain adjacent first-type time windows of the K1 first-type time windows, and there is one of the K1 first-type time windows between any two time-domain adjacent first-type time intervals of the K2 first-type time intervals.

In one subembodiment, the phrase that the K1 first-type time windows and K2 first-type time intervals alternately occur in time domain includes a meaning that any two time-domain adjacent first-type time windows of the K1 first-type time windows are discontinuous, and the K2 first-type time intervals are respectively located in K2 gaps between the K1 first-type time windows.

In one embodiment, the first time interval length is equal to T1 milliseconds, T1 being a real number greater than 1.

In one embodiment, the first time interval length is equal to T1 milliseconds, T1 being a positive integer number greater than 1.

In one embodiment, time resources comprised by the first time interval length are continuous.

In one embodiment, the phrase that the first timer is only started in a first time resource set includes a meaning that the first timer starts timing at a start time of the first time resource set.

In one embodiment, the phrase that the first timer is only started in a first time resource set includes a meaning that the first timer only keeps time in the first time resource set.

In one embodiment, the phrase that the first timer is only started in a first time resource set includes a meaning that the first timer only keeps time in the K1 first-type time windows.

In one embodiment, the phrase that the first timer is only started in a first time resource set includes a meaning that the first timer does not keep time in any time resource other than the first time resource set.

In one embodiment, the phrase that the first timer is only started in a first time resource set includes a meaning that the first timer does not keep time in any time resource other than the K1 first-type time windows.

In one embodiment, the second node in the present disclosure transmits the first information.

In one embodiment, the first time interval length is related to a transmission delay between the second node and the first node.

In one embodiment, the first time interval length is equal to twice the length of a transmission delay between the second node and the first node.

In one embodiment, the first time interval length is related to a Round Trip Time (RTT) between the second node and the first node.

In one embodiment, the first time interval length is equal to the RTT between the second node and the first node.

In one embodiment, the first time interval length is related to an altitude of the second node.

In one embodiment, the first time interval length is related to a distance from the second node to a perigee of the second node.

In one embodiment, the first time interval length is related to an uplink Timing Advance (TA) between the first node and the second node.

In one embodiment, the first time interval length is equal to an uplink TA between the first node and the second node.

In one embodiment, the first time interval length is equal to a sum of T1 milliseconds and T2 milliseconds, T1 and T2 both being non-negative real numbers.

In one subembodiment, T1 milliseconds is equal to the RTT from the first node to the second node.

In one subembodiment, T1 milliseconds equals twice the length of a transmission delay from the second node to the perigee of the second node In one subembodiment, T1 milliseconds is equal to an uplink TA between the first node and the second node.

In one subembodiment, T2 is fixed.

In one subembodiment, T2 is configured by a higher layer signaling.

In one subembodiment, T2 is equal to 4.

In one subembodiment, T2 is equal to 0.

In one subembodiment, T2 is related to the second node's processing capability.

In one embodiment, the first timer is used for updating a wireless connection, the first timer including an RRC timer.

In one embodiment, the first timer is T304 in TS 38.331.

In one embodiment, the first timer is T316 in TS 38.331.

In one embodiment, when the first timer is expired, the first node operates the first procedure.

In one embodiment, when the first timer is not yet expired, the first node does not operate the first procedure.

In one embodiment, a time interval between an end time of reception of the first signal and a start time of the first time resource set is no smaller than the first time interval length.

In one embodiment, the first node is a terminal in Narrowband Internet of Things (NB-IOT).

In one embodiment, the first node is a power-limited terminal.

Embodiment 2

Figure 2:
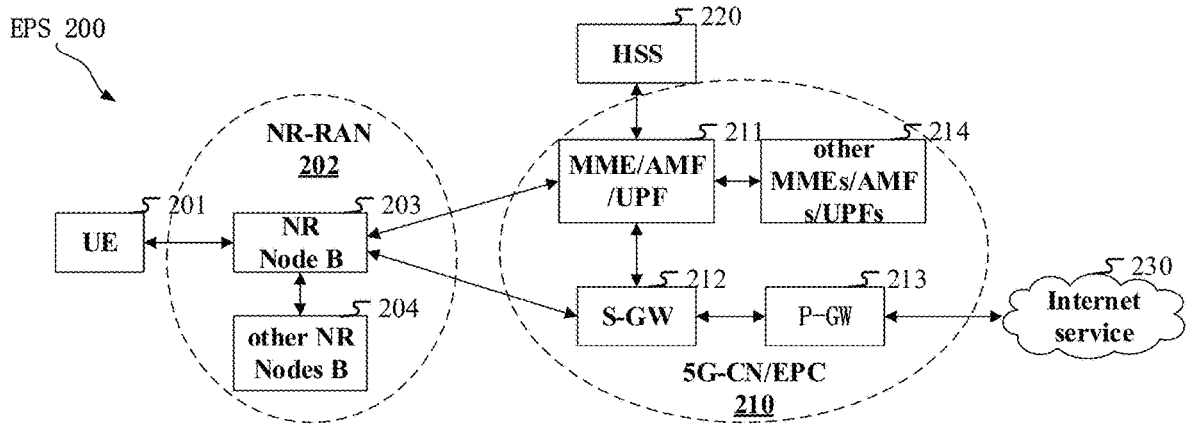
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE), and Long-Term Evolution Advanced (LTE-A) systems. The 5G NR or LTE network architecture 200 may be called an Evolved Packet System (EPS) 200 or any other appropriate term. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Non-Terrestrial base station communications, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure.

In one embodiment, the UE 201 supports wireless communications in NTN.

In one embodiment, the UE 201 supports wireless communications based on NB-IOT.

In one embodiment, the UE 201 supports procedures relevant to mobility management.

In one embodiment, the UE 201 supports transmissions in NTN.

In one embodiment, the UE 201 supports transmissions in large-delay networks.

In one embodiment, the gNB 203 corresponds to the second node in the present disclosure.

In one embodiment, the gNB 203 is a non-terrestrial base station.

In one embodiment, a radio link between the gNB 203 and a terrestrial station is a Feeder Link.

In one embodiment, the gNB 203 supports transmissions in NTN.

In one embodiment, the gNB 203 supports transmissions in large-delay networks.

In one embodiment, the gNB 203 supports wireless communications based on NB-IOT.

In one embodiment, an air interface between the UE 201 and the gNB 203 is a Uu interface.

In one embodiment, a radio link between the UE 201 and the gNB 203 is a cellular link.

In one embodiment, the first node in the present disclosure is a terminal within the coverage of the gNB 203.

In one embodiment, the first node has a Global Positioning System (GPS) capability.

In one embodiment, the first node has a Global Navigation Satellite System (GNSS) capability.

In one embodiment, the first node has a BeiDou Navigation Satellite System (BDS) capability.

In one embodiment, the first node has a Galileo Satellite Navigation System (GALILEO) capability.

Embodiment 3

Figure 3:
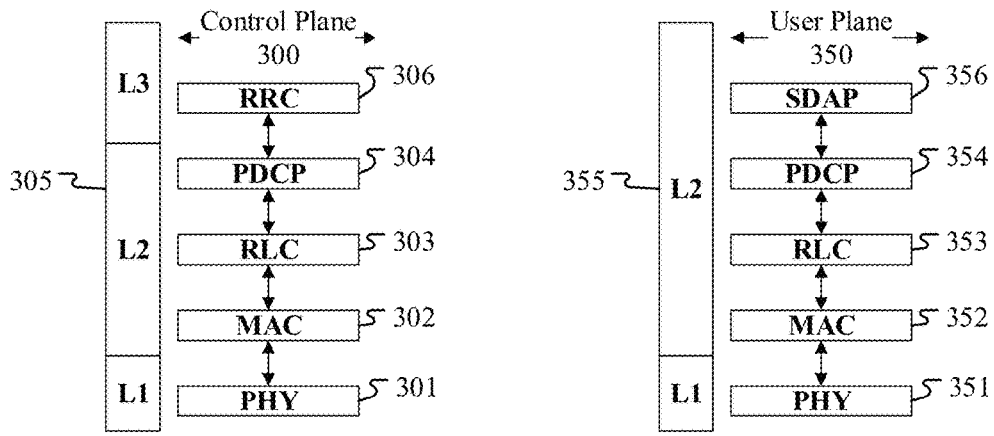
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X) is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between the first communication node and the second communication node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication nodes of the network side. The PDCP sublayer 304 provides multiplexing among variable radio bearers and logical channels. The PDCP sublayer 304 provides security by encrypting a packet and provides support for handover of a second communication node between first communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the PDCP 304 in the second communication node is used to generate scheduling of the first communication node.

In one embodiment, the PDCP 354 in the second communication node is used to generate scheduling of the first communication node.

In one embodiment, the first information in the present disclosure is generated by the PHY301 or the PHY351.

In one embodiment, the first information in the present disclosure is generated by the MAC302 or the MAC352.

In one embodiment, the first information in the present disclosure is generated by the RRC306.

In one embodiment, the first signal in the present disclosure is generated by the PHY301 or the PHY351.

In one embodiment, the first signal in the present disclosure is generated by the MAC302 or the MAC352.

In one embodiment, the first signal in the present disclosure is generated by the RRC306.

In one embodiment, the second signal in the present disclosure is generated by the PHY301 or the PHY351.

In one embodiment, the second signal in the present disclosure is generated by the MAC302 or the MAC352.

In one embodiment, the second signal in the present disclosure is generated by the RRC306.

In one embodiment, the first procedure in the present disclosure starts from the PHY301 or the PHY351.

In one embodiment, the first procedure in the present disclosure starts from the MAC302 or the MAC352.

In one embodiment, the first procedure in the present disclosure starts from the RRC306.

In one embodiment, the first procedure in the present disclosure ends at the PHY301 or the PHY351.

In one embodiment, the first procedure in the present disclosure ends at the MAC302 or the MAC352.

In one embodiment, the first procedure in the present disclosure ends at the RRC306.

In one embodiment, any of the K1 first-type signals in the present disclosure is generated by the PHY301 or the PHY351.

In one embodiment, any of the K1 first-type signals in the present disclosure is generated by the MAC302 or the MAC352.

In one embodiment, any of the K1 second-type signals in the present disclosure is generated by the PHY301 or the PHY351.

In one embodiment, any of the K1 second-type signals in the present disclosure is generated by the MAC302 or the MAC352.

Embodiment 4

Figure 4:
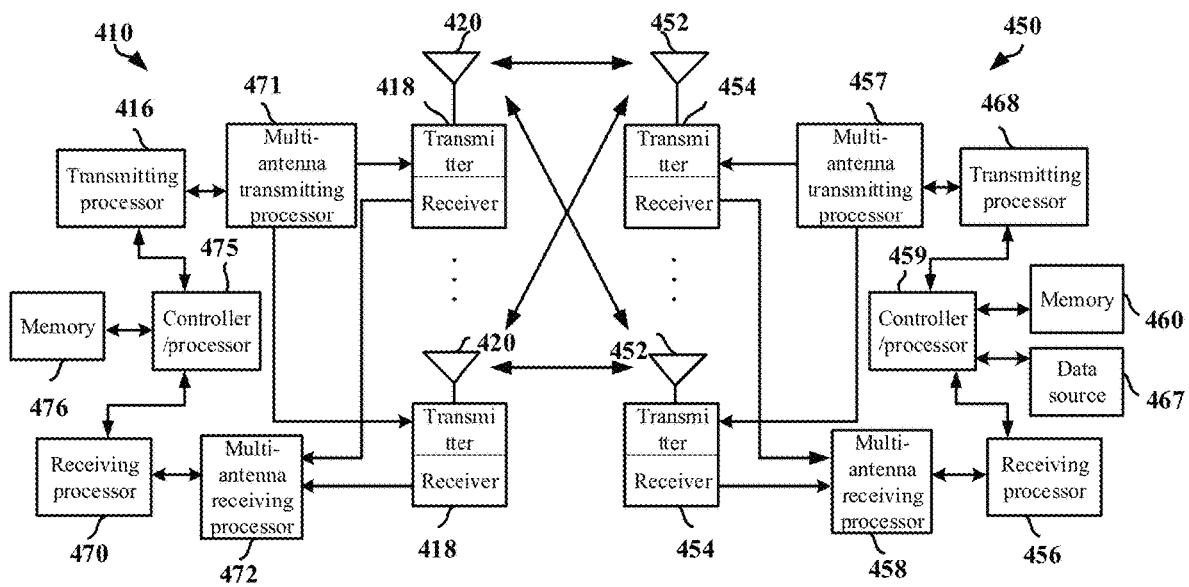
FIG. 4 illustrates a schematic diagram of a first communication device and a second communication device according to one embodiment of the present disclosure.

Embodiment 4 illustrates a schematic diagram of hardcore modules of a communication node according to one embodiment of the present disclosure, as shown in FIG. 4. FIG. 4 is a block diagram of a first communication device 450 and a second communication device 410 in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from a core network is provided to the controller/processor 475. The controller/processor 475 implements the functionality of the L2 layer. In the transmission from the second communication device 410 to the first communication device 450, the controller/processor 475 provides header compression, encryption, packet segmentation and reordering, multiplexing between a logical channel and a transport channel and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping of signal clusters corresponding to each modulation scheme (i.e., BPSK, QPSK, M-PSK, and M-QAM, etc.). The multi-antenna transmitting processor 471 performs digital spatial precoding, including codebook-based precoding and non-codebook-based precoding, and beamforming processing on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to antennas 420.

In a transmission from the second communication device 410 to the first communication device 450, at the first communication device 450, each receiver 454 receives a signal via a corresponding antenna 452. Each receiver 454 recovers information modulated onto the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410. Next, the higher-layer data and control signal are provided to the controller/processor 459. The controller/processor 459 performs functions of the L2 layer. The controller/processor 459 can be associated with a memory 460 that stores program code and data. The memory 460 can be called a computer readable medium. In the transmission from the second communication device 410 to the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including codebook-based precoding and non-codebook-based precoding, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the first communication device 450 to the second communication device 410, the function of the second communication device 410 is similar to the receiving function of the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. In the transmission from the first communication device 450 to the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives first information, transmits a first signal and triggers a first timer, and determines that the first timer is expired and triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first communication device 450 comprises a memory that stores a computer readable instruction program. The computer readable instruction program generates actions when executed by at least one processor. The actions include receiving first information, transmitting a first signal and triggering a first timer, and determining that the first timer is expired and triggering a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits first information, and receives a first signal; a transmitter of the first signal is a first node, and the first signal is used to trigger a first timer for the first node; when the first timer is expired, the first node triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the second communication device 410 comprises a memory that stores a computer readable instruction program. The computer readable instruction program generates actions when executed by at least one processor. The actions include transmitting first information, and receiving a first signal; a transmitter of the first signal is a first node, and the first signal is used to trigger a first timer for the first node; when the first timer is expired, the first node triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first communication device 450 comprises at least one processor and at least one memory. The at least one memory comprises computer program codes; the at least one memory and the computer program codes are configured to be used in collaboration with the at least one processor. The first communication device 450 at least receives first information, receives a first signal and triggers a first timer, determines that the first timer is expired and triggers a first procedure; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the first communication device 450 comprises a memory that stores a computer readable instruction program. The computer readable instruction program generates actions when executed by at least one processor. The actions include receiving first information, receiving a first signal and triggering a first timer, determining that the first timer is expired and triggering a first procedure; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the second communication device 410 comprises at least one processor and at least one memory. The at least one memory comprises computer program codes. The at least one memory and the computer program codes are configured to be used in collaboration with the at least one processor. The second communication device 410 at least transmits first information, and transmits a first signal; a receiver of the first information includes a first node, and the first signal is used for initiating a first timer of the first node; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the second communication device 410 comprises a memory that stores a computer readable instruction program. The computer readable instruction program generates actions when executed by at least one processor. The actions include transmitting first information, and transmitting a first signal; a receiver of the first information includes a first node, and the first signal is used for initiating a first timer of the first node; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the first communication device 450 corresponds to the first node in the present disclosure.

In one embodiment, the second communication device 410 corresponds to the second node in the present disclosure.

In one embodiment, the first communication device 450 is a UE.

In one embodiment, the first communication device 450 is a terminal.

In one embodiment, the second communication device 410 is a base station.

In one embodiment, the second communication device 410 is a network device.

In one embodiment, at least the first four of the antenna 452, the receiver 454, the multi-antenna receiving processor 458, the receiving processor 456 and the controller/processor 459 are used to receive first information; at least the first four of the antenna 420, the transmitter 418, the multi-antenna transmitting processor 471, the transmitting processor 416 and the controller/processor 475 are used to transmit the first information.

In one embodiment, at least the first four of the antenna 452, the transmitter 454, the multi-antenna transmitting processor 457, the transmitting processor 468 and the controller/processor 459 are used to transmit a first signal and trigger a first timer; at least the first four of the antenna 420, the transmitter 418, the multi-antenna receiving processor 472, the receiving processor 470 and the controller/processor 475 are used to receive the first signal.

In one embodiment, at least the first four of the antenna 452, the receiver 454, the multi-antenna receiving processor 458, the receiving processor 456 and the controller/processor 459 are used to monitor a second signal during running of the first timer; at least the first four of the antenna 420, the transmitter 418, the multi-antenna transmitting processor 471, the transmitting processor 416 and the controller/processor 475 are used to transmit the second signal.

In one embodiment, at least one of the multi-antenna transmitting processor 457, the transmitting processor 468, the multi-antenna receiving processor 458, the receiving processor 456, or the controller/processor 459 is used to determine that a first timer is expired and trigger a first procedure.

In one embodiment, at least the first four of the antenna 452, the receiver 454, the multi-antenna receiving processor 458, the receiving processor 456 and the controller/processor 459 are used to receive first information; at least the first four of the antenna 420, the transmitter 418, the multi-antenna transmitting processor 471, the transmitting processor 416 and the controller/processor 475 are used to transmit the first information.

In one embodiment, at least the first four of the antenna 452, the receiver 454, the multi-antenna receiving processor 458, the receiving processor 456 and the controller/processor 459 are used to receive a first signal and trigger a first timer; at least the first four of the antenna 420, the transmitter 418, the multi-antenna transmitting processor 471, the transmitting processor 416 and the controller/processor 475 are used to transmit the first signal.

In one embodiment, when a first condition is fulfilled in the first time resource set, at least one of the multi-antenna receiving processor 458, the receiving processor 456, the multi-antenna transmitting processor 457, the transmitting processor 468 or the controller/processor 459 is used to stop the first timer.

In one embodiment, when a first condition is not fulfilled in the first time resource set, at least one of the multi-antenna receiving processor 458, the receiving processor 456, the multi-antenna transmitting processor 457, the transmitting processor 468 or the controller/processor 459 is used to keep the counting of the first timer.

In one embodiment, at least the first four of the antenna 452, the transmitter 454, the multi-antenna transmitting processor 457, the transmitting processor 468 and the controller/processor 459 are used to transmit K1 second-type signals respectively in K1 second-type time windows; at least the first four of the antenna 420, the transmitter 418, the multi-antenna receiving processor 472, the receiving processor 470 and the controller/processor 475 are used to receive the K1 second-type signals respectively in K1 second-type time windows.

In one embodiment, at least the first four of the antenna 452, the receiver 454, the multi-antenna receiving processor 458, the receiving processor 456 and the controller/processor 459 are used to receive K1 first-type signals respectively in the K1 first-type time windows; at least the first four of the antenna 420, the transmitter 418, the multi-antenna transmitting processor 471, the transmitting processor 416 and the controller/processor 475 are used to transmit the K1 first-type signals respectively in the K1 first-type time windows.

In one embodiment, at least one of the multi-antenna transmitting processor 457, the transmitting processor 468, the multi-antenna receiving processor 458, the receiving processor 456, or the controller/processor 459 is used to determine that a first timer is expired and trigger a first procedure.

Embodiment 5A

Figure 5A:
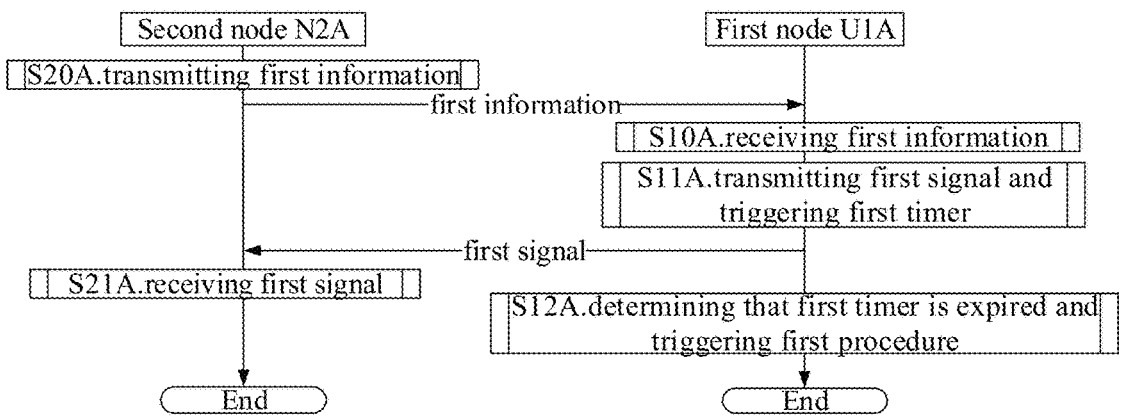
FIG. 5A illustrates a flowchart of first information according to one embodiment of the present disclosure.

Embodiment 5A illustrates a flowchart of first information, as shown in FIG. 5A. In FIG. 5A, a first node U1A and a second node N2A are in communications through a radio link. It should be particularly noted that the sequence of embodiments arranged herein does not set any limit on the order of signal transmissions or implementations in the present disclosure.

The first node U1A receives first information in step S10A, transmits a first signal and triggers a first timer in step S11A, and determines that the first timer is expired and triggers a first procedure in step S12A.

The second node N2A transmits first information in step S20A, and receives a first signal in step S21A.

In Embodiment 5A, the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one subembodiment, the first parameter group comprises a type corresponding to the second node N2.

In one subsidiary embodiment of the above subembodiment, the type corresponding to the second node N2 is one of GEO satellite, Medium Earth Orbiting (MEO) satellite, Low Earth Orbit (LEO) satellite, Highly Elliptical Orbiting (HEO) satellite or Airborne Platform.

In one subembodiment, the first parameter group comprises an altitude at which the second node N2 is located.

In one subembodiment, the first parameter group comprises a running speed and a running direction of the second node N2.

In one subembodiment, the first parameter group is used to determine L1 candidate time values, and the first time interval length is one of the L1 candidate time values, and the first information is used for indicating the first time interval length from the L1 candidate time values, L1 being a positive integer greater than 1.

In one embodiment, the first timer is T312, and the first signal comprises a measurement report; the first procedure includes one of entering RRC_IDLE state, initiating connection reestablishment, or initiating SCG-failure information.

In one subembodiment, the measurement report refers to a measurement report in TS 38.331.

In one subembodiment, when the first timer is configured in an MCG, the measurement report is for a Measurement Entity configured with the first timer, and a T310 in a Primary Cell (PCell) is still running.

In one subembodiment, when the first timer is configured in an SCG, the measurement report is for a Measurement Entity configured with the first timer, and a T310 in a Primary SCG Cell (PSCell) is still running.

In one subembodiment, when the first timer is maintained in an MCG, with security still not activated, the first procedure includes entering RRC_IDLE state; otherwise, the first procedure includes initiating connection re-establishment.

In one subembodiment, when the first timer is maintained in an SCG, the first procedure includes notifying the Evolved-UTRAN/New RAT (E-UTRAN/NR) of a Radio Link Failure (RLF) that occurs in an SCG.

In one subembodiment, when the first timer is maintained in an SCG, the first procedure includes initiating SCG-failure information.

In one embodiment, the first timer is T316, and the first signal comprises a message of MCG failure information; the first procedure includes initiating connection reestablishment.

In one subembodiment, the message of MCG failure information refers to MCGFailureInformation Message in TS 38.331.

In one embodiment, the first timer is T300, and the first signal comprises an RRC setup request; the first procedure includes resetting MAC.

In one subembodiment, the RRC setup request refers to RRCSetupRequest in TS 38.331.

In one embodiment, the first timer is T301, and the first signal comprises an RRC reestablishment request; the first procedure includes entering RRC_IDLE state.

In one subembodiment, the RRC reestablishment request refers to RRCReestablishmentRequest in TS 38.331.

In one embodiment, the phrase that the first timer is expired includes a meaning that running time of the first timer reaches a first threshold, the first threshold is a positive integer, and the first threshold is measured in milliseconds, the first information being used to determine the first threshold.

In one subembodiment, the first node U1A does not perform radio link monitoring in a time interval between an end time of transmission of the first signal and a start of the first time window.

In one subsidiary embodiment of the above subembodiment, the phrase of not performing radio link monitoring means that a counter N310 does not count.

In one subsidiary embodiment of the above subembodiment, the phrase of not performing radio link monitoring means that a counter N311 does not count.

In one subsidiary embodiment of the above subembodiment, the phrase of not performing radio link monitoring means not triggering out-sync indication.

In one subsidiary embodiment of the above subembodiment, the phrase of not performing radio link monitoring means not triggering in-sync indication.

In one embodiment, the first node U1A performs radio link monitoring in the first time window.

In one embodiment, the first information indicates the first threshold.

In one embodiment, the first information is used to determine a first parameter group, the first parameter group being used to determine the first threshold.

In one subembodiment, the first threshold is one of Q1 candidate thresholds, the Q1 candidate thresholds respectively correspond to Q1 satellite types, and a type of the second node N2 is one of the Q1 satellite types, the type of the second node N2 being used to determine the first threshold out of the Q1 candidate thresholds.

In one subembodiment, the first threshold is one of Q1 candidate thresholds, the Q1 candidate thresholds respectively correspond to Q1 altitude intervals, and an altitude interval where the second node N2 is located is one of the Q1 altitude intervals, the altitude interval where the second node N2 is located being used to determine the first threshold out of the Q1 candidate thresholds.

Embodiment 5B

Figure 5B:
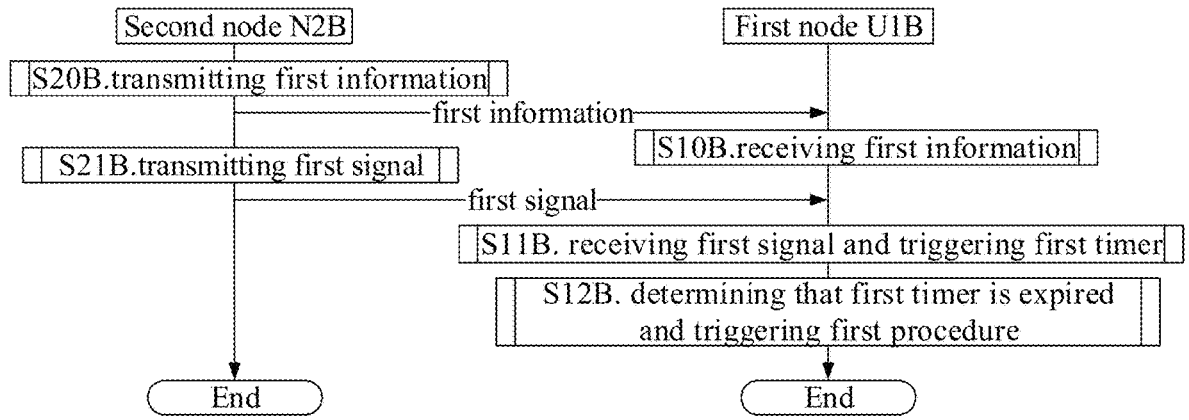
FIG. 5B illustrates a flowchart of first information according to one embodiment of the present disclosure.

Embodiment 5B illustrates a flowchart of first information, as shown in FIG. 5B. In FIG. 5B, a first node U1B and a second node N2B are in communications through a radio link. It should be particularly noted that the sequence of embodiments arranged herein does not set any limit on the order of signal transmissions or implementations in the present disclosure.

The first node U1B receives first information in step S10B, receives a first signal and triggers a first timer in step S11B, determines that the first timer is expired and triggers a first procedure in step S12B.

The second node N2B transmits first information in step S20B, and transmits a first signal in step S21B.

In Embodiment 5B, the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, a physical layer channel bearing the first information is a Physical Downlink Shared Channel (PDSCH).

In one embodiment, a physical layer channel bearing the first information is a PDSCH.

In one embodiment, the first information is used to determine a first parameter group, the first parameter group is used to determine the first time interval length, and the first parameter group comprises at least one of a type corresponding to the second node N2, an altitude of the second node N2, a running speed of the second node N2 or a running direction of the second node N2.

In one subembodiment, the first parameter group comprises the type corresponding to the second node N2.

In one subsidiary embodiment of the above subembodiment, the type corresponding to the second node N2 is one of GEO satellite, Medium Earth Orbiting (MEO) satellite, Low Earth Orbit (LEO) satellite, Highly Elliptical Orbiting (HEO) satellite or Airborne Platform.

In one subembodiment, the first parameter group comprises the altitude of the second node N2.

In one subembodiment, the first parameter group comprises the miming speed and the running direction of the second node N2.

In one subembodiment, the first parameter group is used to determine L1 candidate time values, and the first time interval length is one of the L1 candidate time values, and the first information is used for indicating the first time interval length from the L1 candidate time values, L1 being a positive integer greater than 1.

In one embodiment, the first timer is T304; the first signal comprises RRCReconfiguration with reconfigurationWithSync, or the first signal comprises Conditional Reconfiguration Execution; the first procedure includes one of initiating RRC reestablishment, reference source RAT protocols implementation or initiating SCG-failure information.

In one subembodiment, the message of MCG failure information refers to MCGFailurelnformation Message in TS 38.331.

In one embodiment, the phrase that the first timer is expired includes a meaning that running time of the first timer reaches a first threshold, the first threshold is a positive integer, and the first threshold is measured in milliseconds, the first information being used to determine the first threshold.

In one subembodiment, the first information indicates the first threshold.

In one subembodiment, the first information is used to determine a first parameter group, the first parameter group being used to determine the first threshold.

In one subsidiary embodiment of the above subembodiment, the first threshold is one of Q1 candidate thresholds, the Q1 candidate thresholds respectively correspond to Q1 satellite types, and a type of the second node N2 is one of the Q1 satellite types, the type of the second node N2 being used to determine the first threshold out of the Q1 candidate thresholds.

In one subsidiary embodiment of the above subembodiment, the first threshold is one of Q1 candidate thresholds, the Q1 candidate thresholds respectively correspond to Q1 altitude intervals, and an altitude interval where the second node N2 is located is one of the Q1 altitude intervals, the altitude interval where the second node N2 is located being used to determine the first threshold out of the Q1 candidate thresholds.

In one embodiment, the first node U1 does not perform radio link monitoring during a time interval between an end time of reception of the first signal and a start time of the first time resource set.

In one subsidiary embodiment of the above subembodiment, the phrase of not performing radio link monitoring means that a counter N310 does not count.

In one subsidiary embodiment of the above subembodiment, the phrase of not performing radio link monitoring means that a counter N311 does not count.

In one subsidiary embodiment of the above subembodiment, the phrase of not performing radio link monitoring means not triggering out-sync indication.

In one subsidiary embodiment of the above subembodiment, the phrase of not performing radio link monitoring means not triggering in-sync indication.

In one subembodiment, the first node U1 performs radio link monitoring in the first time resource set.

In one subembodiment, the first node U1 performs radio link monitoring in the K1 first-type time windows.

Embodiment 6A

Figure 6A:
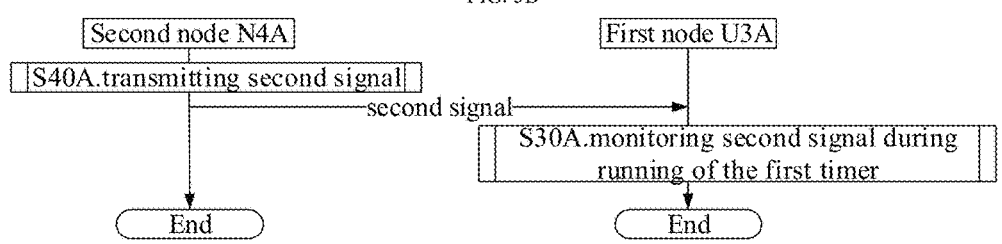
FIG. 6A illustrates a flowchart of a second signal according to one embodiment of the present disclosure.

Embodiment 6A illustrates a flowchart of a second signal, as shown in FIG. 6A. In FIG. 6A, a first node U3A and a second node N4A are in communication through a radio link. It should be particularly noted that the sequence of embodiments arranged herein does not set any limit on the order of signal transmissions or implementations in the present disclosure. In case of no conflict, embodiments and sub-embodiments provided in the Embodiment 6A can be applied to the Embodiment 7A; reversely, the embodiments and sub-embodiments provided in the Embodiment 7A can be applied to the Embodiment 6A.

The first node U3A monitors a second signal during running of the first timer in step S30A.

The second node N4A transmits a second signal in step S40A.

In Embodiment 6A, the first node U3A receives the second signal successfully during the running of the first timer, and the first timer stops running.

In one embodiment, the phrase of monitoring a second signal during running of the first timer includes a meaning that when the first timer is in a state of timing, the first node U3A is monitoring the second signal in the first time window.

In one embodiment, the phrase of monitoring a second signal during running of the first timer includes a meaning that when the first timer is in a stopped state, the first node U3A stops monitoring the second signal in the first time window.

In one embodiment, the phrase of monitoring a second signal during running of the first timer includes a meaning that when the first timer is in a stopped state, the first node U3A autonomously determines whether to monitor the second signal in the first time window.

In one embodiment, the phrase that the first timer stops running includes a meaning that the first timer no longer keeps time.

In one embodiment, the phrase that the first timer stops running includes a meaning that the first timer retains the currently accumulated time value.

In one embodiment, the phrase that the first timer stops running includes a meaning that the first timer is reset.

In one embodiment, the phrase that the first timer stops running includes a meaning that a time value accumulated in the first timer is 0.

In one embodiment, the first timer is T312, the second signal comprises a first sub-signal, and the first sub-signal comprises RRCReconfiguration with reconfigurationWithSync.

In one embodiment, the first timer is T312, the second signal comprises a first integer number of consecutive in-sync indications.

In one subembodiment, the first integer is N311 in TS 38.331.

In one subembodiment, the consecutive in-sync indications are from lower layers.

In one subembodiment, the consecutive in-sync indications are for a SpCell.

In one embodiment, the first timer is T316, and the second signal comprises Resumption of MCG Transmission.

In one embodiment, the first timer is T316, and the second signal comprises RRC Release.

In one embodiment, the first timer is T300, and the second signal comprises RRCSetup.

In one embodiment, the first timer is T300, and the second signal comprises RRCReject.

In one embodiment, the first timer is T300, and the second signal comprises Cell Re-selection.

In one embodiment, the first timer is T301, and the second signal comprises RRCReestablishment.

In one embodiment, the first timer is T301, and when a selected cell of the first node U3 becomes unsuitable, the second signal comprises RRCSetup Message.

Embodiment 6B

Figure 6B:
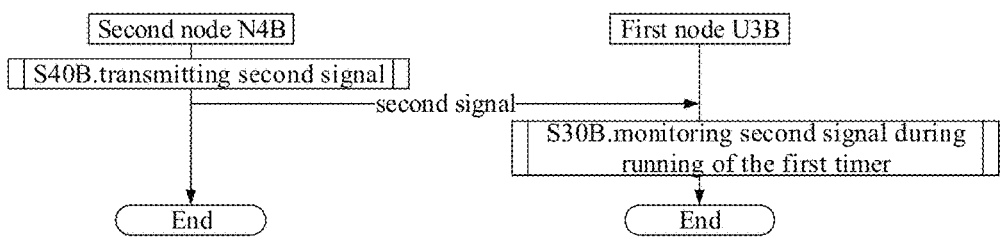
FIG. 6B illustrates a flowchart of a second signal according to one embodiment of the present disclosure.

Embodiment 6B illustrates a flowchart of a second signal, as shown in FIG. 6B. In FIG. 6B, a first node U3B and a second node N4B are in communications through a radio link. It should be particularly noted that the sequence of embodiments arranged herein does not set any limit on the order of signal transmissions or implementations in the present disclosure. In case of no conflict, embodiments and sub-embodiments provided in the Embodiment 6B can be applied to the Embodiment 5B and the Embodiment 5B; reversely, the embodiments and sub-embodiments provided in the Embodiment 5B and the Embodiment 8B can be applied to the Embodiment 6B.

The first node U3B monitors a second signal during miming of the first timer in step S30B.

The second node N4B transmits a second signal in step S40B.

In Embodiment 6B, the first node U3B successfully receives the second signal during the running of the first timer, and the first timer stops running.

In one embodiment, a physical layer channel bearing the second signal is a PDSCH.

In one embodiment, the phrase of monitoring a second signal during running of the first timer includes a meaning that when the first timer is in a state of timing, the first node U3B is monitoring the second signal in the first time resource set.

In one embodiment, the phrase of monitoring a second signal during running of the first timer includes a meaning that when the first timer is in a stopped state, the first node U3B stops monitoring the second signal in the first time resource set.

In one embodiment, the phrase of monitoring a second signal during running of the first timer includes a meaning that when the first timer is in a stopped state, the first node U3B autonomously determines whether to monitor the second signal in the first time resource set.

In one embodiment, the phrase that the first timer stops running includes a meaning that the first timer no longer keeps time.

In one embodiment, the phrase that the first timer stops running includes a meaning that the first timer retains the currently accumulated time value.

In one embodiment, the phrase that the first timer stops running includes a meaning that the first timer is reset.

In one embodiment, the phrase that the first timer stops miming includes a meaning that a time value accumulated in the first timer is 0.

In one embodiment, the first timer is T304, and the second signal comprises SCG Release.

In one subembodiment, the first timer belongs to an SCG.

In one embodiment, the first timer is T316, and the second signal comprises Resumption of MCG Transmission.

In one embodiment, the first timer is T316, and the second signal comprises RRCRelease.

Embodiment 7A

Figure 7A:
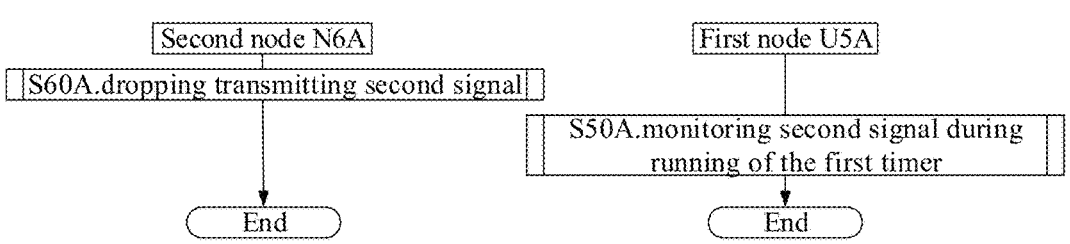
FIG. 7A illustrates a flowchart of a second signal according to another embodiment of the present disclosure.

Embodiment 7A illustrates another flowchart of a second signal, as shown in FIG. 7A. In FIG. 7A, a first node U5A and a second node N6A are in communication through a radio link. It should be particularly noted that the sequence of embodiments arranged herein does not set any limit on the order of signal transmissions or implementations in the present disclosure.

The first node U5A monitors a second signal during miming of the first timer in step S50A.

The second node N6A drops transmitting the second signal in step S60A.

In Embodiment 7A, the first node U5A does not receive the second signal successfully before expiration of the first timer, and the first node U5A triggers the first procedure.

Embodiment 7B

Figure 7B:
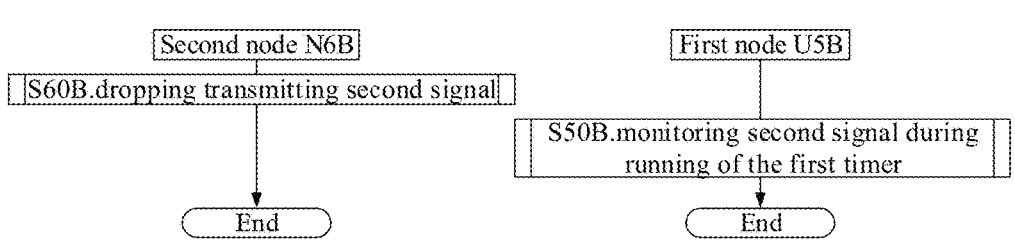
FIG. 7B illustrates a flowchart of a second signal according to another embodiment of the present disclosure.

Embodiment 7B illustrates a flowchart of a second signal, as shown in FIG. 7B. In FIG. 7B, a first node U5B and a second node N6B are in communications through a radio link. It should be particularly noted that the sequence of embodiments arranged herein does not set any limit on the order of signal transmissions or implementations in the present disclosure. In case of no conflict, embodiments and sub-embodiments provided in the Embodiment 7B can be applied to the Embodiment 5B and the Embodiment 5B; reversely, the embodiments and sub-embodiments provided in the Embodiment 5B and the Embodiment 8B can be applied to the Embodiment 7B.

The first node U5B monitors a second signal during miming of the first timer in step S50B.

The second node N6B drops transmitting a second signal in step S60B.

In Embodiment 7B, the first node U5B does not receive the second signal successfully before expiration of the first timer, and the first node U5B triggers the first procedure.

Embodiment 8A

Figure 8A:
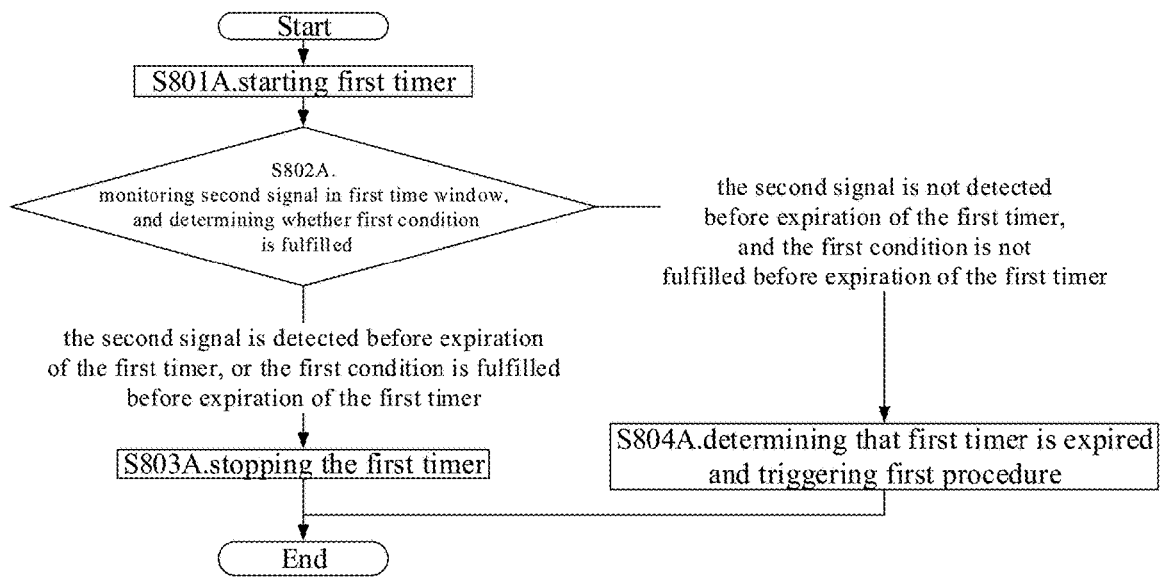
FIG. 8A illustrates a schematic diagram of triggering a first procedure according to one embodiment of the present disclosure.

Embodiment 8A illustrates a schematic diagram of triggering a first procedure, as shown in FIG. 8A. In FIG. 8A, the first node implements the following steps of:

starting a first timer in step 801A; and monitoring a second signal in a first time window, and determining whether a first condition is fulfilled in step 802A;

entering step 803A on the premise that the second signal is detected before expiration of the first timer, or that the first condition is fulfilled before expiration of the first timer;

entering step 804A on the premise that the second signal is not detected before expiration of the first timer, or that the first condition is not fulfilled before expiration of the first timer;

stopping the first timer in step 803A; and determining that the first timer is expired and triggering a first procedure in step 804A.

In one embodiment, before expiration of the first timer and when a first condition is fulfilled in the first time window, stop the first timer.

In one embodiment, before expiration of the first timer and when the second signal is detected in the first time window, stop the first timer.

In one embodiment, before expiration of the first timer, when a first condition is not fulfilled in the first time window and the second signal is not detected in the first time window, trigger a first procedure.

In one subembodiment, the first node resets the first timer.

In one subembodiment, the first node sets the first timer as 0.

In one embodiment, the first timer is T312, the first condition comprises one of the first node initiating connection reestablishment, T310 of a SpCell being expired or an SCG being released.

In one embodiment, when the first timer is T316, the first condition includes the first node initiating connection reestablishment.

In one embodiment, when the first timer is T300, the first condition comprises a higher layer dropping connection reestablishment.

Embodiment 5B

Figure 8B:
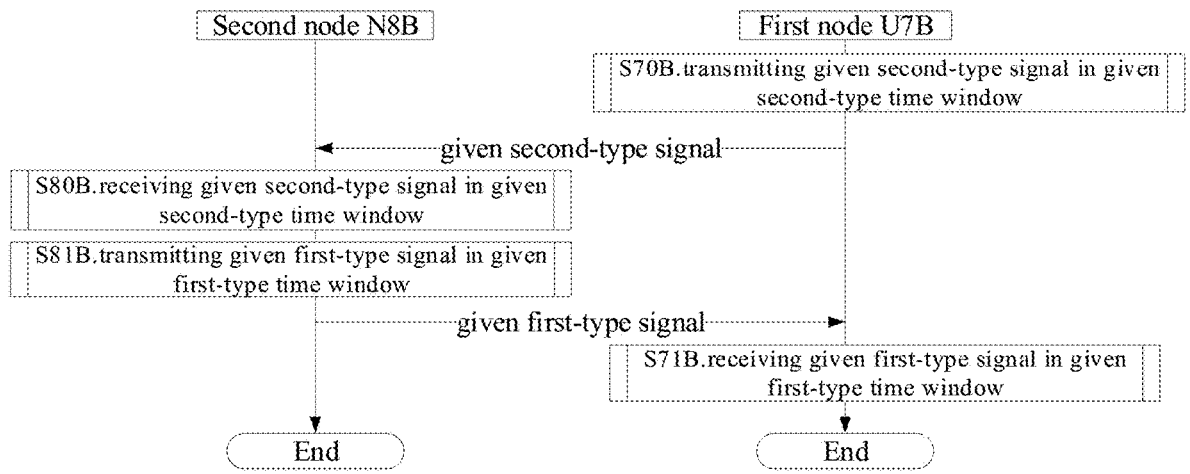
FIG. 8B illustrates a schematic diagram of K1 second-type signals according to one embodiment of the present disclosure.

Embodiment 5B illustrates a schematic diagram of K1 second-type signals, as shown in FIG. 8B.

The first node U7B transmits a given second-type signal in a given second-type time window in step S70B, and receives a given first-type signal in a given first-type time window in step S71B.

The second node N5B receives a given second-type signal in a given second-type time window in step S80B, and transmits a given first-type signal in a given first-type time window in step S81B.

In Embodiment 5B, the given second-type signal is any second-type signal of the K1 second-type signals, and the given second-type time window is one of the K1 second-type time windows in which the first node U7 transmits the given second-type signal; the given first-type signal is one of the K1 first-type signals that is used for feedback of the given second-type signal, and the given first-type time window is one of the K1 first-type time windows in which the first node U7 receives the given first-type signal.

In one embodiment, the K1 second-type time windows respectively correspond to the K1 first-type time windows, and the K1 first-type signals are respectively used for feedbacks of the K1 second-type signals; at least one of the K1 second-type signals is used for random access, and at least one of the K1 first-type signals is used for feedback of random access.

In one embodiment, the K1 second-type signals include a Preamble.

In one embodiment, the K1 second-type signals include a Msg3.

In one embodiment, the K1 second-type signals include a MsgA.

In one embodiment, the K1 first-type signals include an RAR.

In one embodiment, the K1 first-type signals include a Msg4.

In one embodiment, the K1 first-type signals include a MsgB.

In one embodiment, a value of the K1 is related to a maximum number of transmissions of RRC configuration.

In one embodiment, the K1 second-type signals include a retransmission of a Preamble.

In one embodiment, the K1 second-type signals include a retransmission of a Msg3.

In one embodiment, the K1 second-type signals include a retransmission of a MsgA.

In one embodiment, the K1 first-type signals include a retransmission of an RAR.

In one embodiment, the K1 first-type signals include a retransmission of a Msg4.

In one embodiment, the K1 first-type signals include a retransmission of a MsgB.

In one embodiment, at least one second-type signal of the K1 second-type signals is used for 2-Step RACH.

In one embodiment, at least one second-type signal of the K1 second-type signals is used for 4-Step RACH.

In one embodiment, at least one first-type signal of the K1 first-type signals is used for 2-Step RACH.

In one embodiment, at least one first-type signal of the K1 first-type signals is used for 4-Step RACH.

In one embodiment, the K1 second-type time windows are respectively located before the K1 first-type time windows.

In one embodiment, the K1 second-type time windows and the K1 first-type time windows alternately occur in time domain.

In one embodiment, there is one of the K1 second-type time windows between any two time-domain adjacent first-type time windows of the K1 first-type time windows, and there is one of the K1 first-type time windows between any two time-domain adjacent second-type time windows of the K1 second-type time windows.

In one embodiment, a length of a time interval between an end time of a second-type time window which is earliest among the K1 second-type time windows in time domain and a start time of a first-type time window which is earliest among the K1 first-type time windows in time domain is no smaller than the first time interval length.

In one embodiment, the step 70B is implemented by the first node U7B for K1 times in the first time resource set, the K1 times respectively corresponding to transmitting the K1 second-type signals.

In one embodiment, the step 71B is implemented by the first node U7B for K1 times in the first time resource set, the K1 times respectively corresponding to receiving the K1 first-type signals.

In one embodiment, the step 80B is implemented by the second node N8B for K1 times in the first time resource set, the K1 times respectively corresponding to receiving the K1 second-type signals.

In one embodiment, the step 81B is implemented by the second node N8B for K1 times in the first time resource set, the K1 times respectively corresponding to transmitting the K1 first-type signals.

Embodiment 9A

Figure 9A:
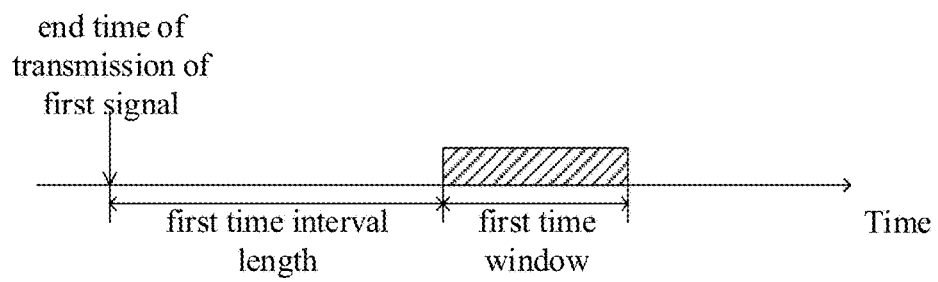
FIG. 9A illustrates a schematic diagram of a first time window according to one embodiment of the present disclosure.

Embodiment 9A illustrates a schematic diagram of a first time window; as shown in FIG. 9A. In FIG. 9A, the first time window comprises a positive integer number of consecutive slots; a time interval between an end time of transmission of the first signal and a start of the first time window is equal to the first time interval length.

In one embodiment, the end time of transmission of the first signal refers to an end time of a last Orthogonal Frequency Division Multiplexing (OFDM) symbol occupied by the first signal in time domain.

In one embodiment, the end time of transmission of the first signal refers to a boundary of a last OFDM symbol occupied by the first signal in time domain.

In one embodiment, the end time of transmission of the first signal refers to an end time of a last slot occupied by the first signal in time domain.

In one embodiment, the end time of transmission of the first signal refers to a boundary of a last slot occupied by the first signal in time domain.

In one embodiment, the end time of transmission of the first signal refers to an end time of slots occupied by the first signal in time domain.

In one embodiment, the end time of transmission of the first signal refers to a boundary of slots occupied by the first signal in time domain.

Embodiment 9B

Figure 9B:
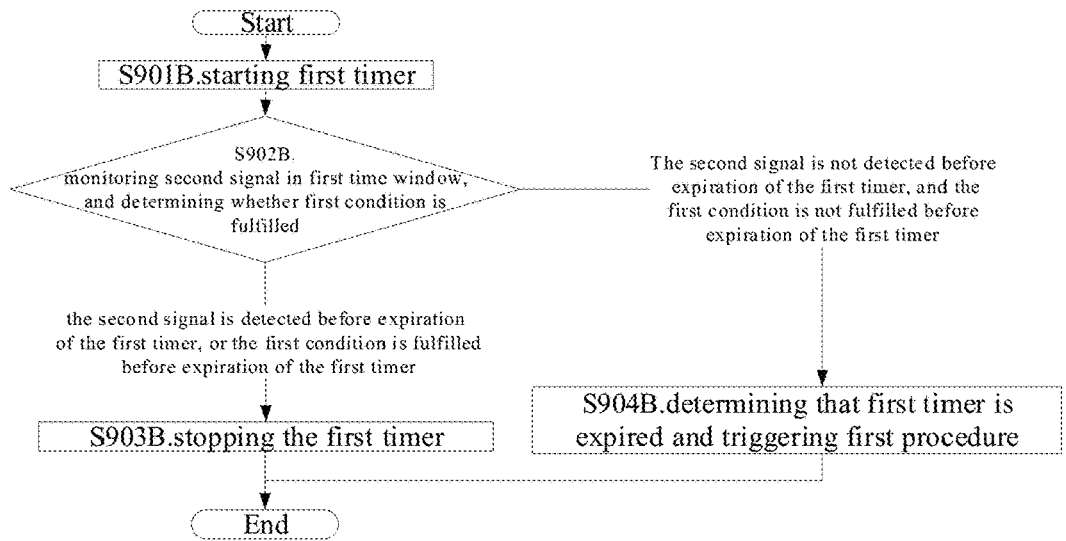
FIG. 9B illustrates a schematic diagram of triggering a first procedure according to one embodiment of the present disclosure.

Embodiment 9B illustrates a schematic diagram of triggering a first procedure, as shown in FIG. 9B. In FIG. 9B, the first node implements the following steps:
 starting a first timer in step 901B;
 monitoring a second signal in a first time window, and determining whether a first condition is fulfilled in step 902B;
 entering step 903B on the premise that the second signal is detected before expiration of the first timer, or that the first condition is fulfilled before expiration of the first timer;
 entering step 904B on the premise that the second signal is not detected before expiration of the first timer, or that the first condition is not fulfilled before expiration of the first timer;
 stopping the first timer in step 903B;
 determining that the first timer is expired and triggering a first procedure in step 904B.

In one embodiment, before expiration of the first timer and when a first condition is fulfilled in the first time window, stop the first timer.

In one embodiment, before expiration of the first timer and when the second signal is detected in the first time window, stop the first timer.

In one embodiment, before expiration of the first timer, when a first condition is not fulfilled in the first time window and the second signal is not detected in the first time window, trigger a first procedure.

In one subembodiment, the first node resets the first timer.

In one subembodiment, the first node sets the first timer as 0.

In one embodiment, the first timer is T304, the first condition includes the first node successfully completing random access, or the first condition includes an SCG being released.

In one embodiment, the first timer is T316, the first condition includes the first node initiating connection reestablishment.

Embodiment 10A

Figure 10A:
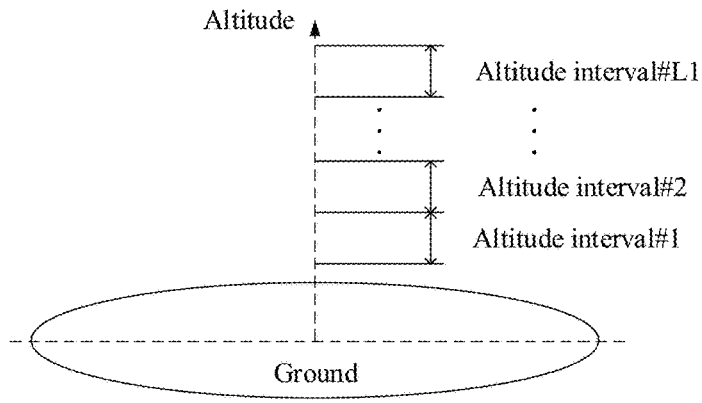
FIG. 10A illustrates a schematic diagram of a first parameter group according to one embodiment of the present disclosure.

Embodiment 10A illustrates a schematic diagram of a first parameter group; as shown in FIG. 10A. In FIG. 10A, the first parameter group comprises information about an altitude of the second node in the present disclosure. The altitude at which the second node is located is within a first altitude interval of L1 altitude intervals, the L1 altitude intervals respectively corresponding to L1 candidate time values, and the first time interval length is equal to a candidate time value of the L1 candidate time values that corresponds to the first altitude interval; L1 is a positive integer greater than 1; and altitude interval #1-altitude interval #L1 illustrated in FIG. 10A respectively correspond to the L1 altitude intervals.

In one embodiment, any of the L1 candidate time values is equal to a positive integer number of (more than one) milliseconds.

In one embodiment, the type of satellite corresponding to the second node is used to determine the first altitude interval where the second node is located.

Embodiment 10B

Figure 10B:
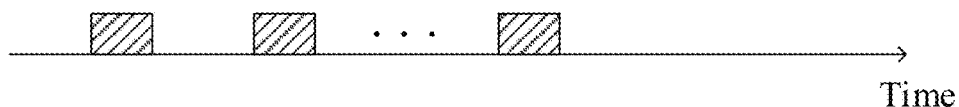
FIG. 10B illustrates a schematic diagram of a first time resource set according to one embodiment of the present disclosure.

Embodiment 10B illustrates a schematic diagram of a first time resource set; as shown in FIG. 10B. In FIG. 10B, the first time resource set comprises K1 first-type time windows, and any of the K1 first-type time windows comprises a positive integer number of consecutive slots; a time interval between any two time-domain adjacent first-type time windows of the K1 first-type time windows is no smaller than the first time interval length.

Embodiment 11A

Figure 11A:
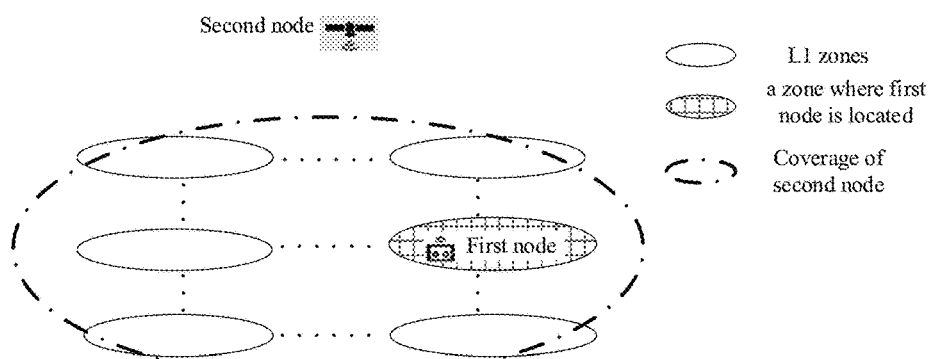
FIG. 11A illustrates a schematic diagram of a first parameter group according to another embodiment of the present disclosure.

Embodiment 11A illustrates another schematic diagram of a first parameter group; as shown in FIG. 11A. In FIG. 11A, the first parameter group comprises an inclination angle of the second node to the first node in the present disclosure.

The second node's coverage includes L1 zones, and the L1 zones respectively correspond to L1 candidate inclination angles, the inclination angle of the second node to the first node is a first inclination angle of the L1 candidate inclination angles, the L1 candidate inclination angles respectively corresponding to L1 candidate time values, and the first time interval length is equal to one of the L1 candidate time values corresponding to the first inclination angle; L1 is a positive integer greater than 1; zone #1-zone #L1 illustrated in FIG. 11A respectively correspond to the L1 candidate inclination angles.

In one embodiment, any of the L1 candidate time values is equal to a positive integer number of (more than one) milliseconds.

In one embodiment, a candidate zone where the first node is located is used to determine the first inclination angle.

In one embodiment, the L1 zones respectively correspond to L1 Beams.

In one embodiment, the L1 zones respectively correspond to L1 antenna ports.

In one embodiment, the L1 zones respectively correspond to L1 Channel State Information Reference Signal (CSI-RS) resources.

In one embodiment, the L1 zones respectively correspond to L1 SSB resources.

Embodiment 11B

Figure 11B:
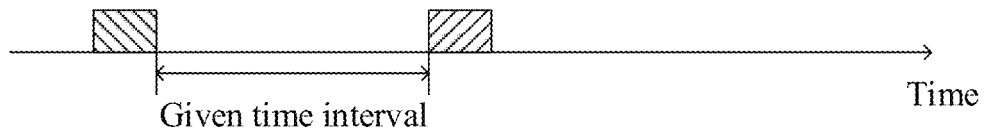
FIG. 11B illustrates a schematic diagram of a given first-type time window and a given second-type time window according to one embodiment of the present disclosure.

Embodiment 11B illustrates a schematic diagram of a given first-type time window and a given second-type time window; as shown in FIG. 11B. In FIG. 11B, a time interval between the given first-type time window and the given second-type time window is equal to a given time interval; the given second-type time window is any one of the K1 second-type time windows, and the given second-type time window is a second-type time window in which the first node transmits a given second-type signal of the K1 second-type signals; a given first-type signal is one of the K1 first-type signals that is used for feedback of the given second-type signal, and the given first-type time window is one of the K1 first-type time windows in which the first node receives the given first-type signal.

In one embodiment, the given time interval in time domain is of a duration no smaller than the first time interval length in the present disclosure.

Embodiment 12A

Figure 12A:
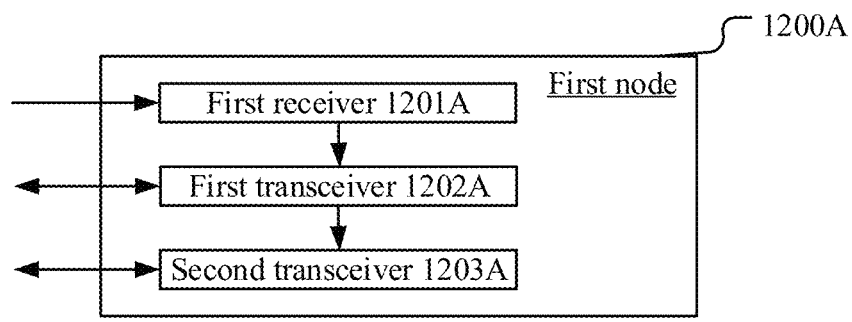
FIG. 12A illustrates a structure block diagram of a processing device in a first node according to one embodiment of the present disclosure.

Embodiment 12A illustrates a structure block diagram of a processing device in a first node; as shown in FIG. 12A. In FIG. 12A, a first node 1200A comprises a first receiver 1201A, a first transceiver 1202A and a second transceiver 1203A.

The first receiver 1201A receives first information;

the first transceiver 1202A, transmits a first signal and triggers a first timer; and the second transceiver 1203A determines a first timer and triggers a first procedure.

In Embodiment 12A, the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, the first transceiver 1202A monitors a second signal during running of the first timer; the first node successfully receives the second signal during the running of the first timer, and the first timer stops running; or the first node does not receive the second signal successfully before expiration of the first timer, and the first node triggers the first procedure.

In one embodiment, the first timer is T312, and the first signal comprises a measurement report; the first procedure includes one of entering RRC_IDLE state, initiating connection reestablishment, or initiating SCG-failure information.

In one embodiment, the first timer is T316, and the first signal comprises a message of MCG failure information;

the first procedure includes initiating connection reestablishment.

In one embodiment, the first timer is T300, and the first signal comprises an RRC setup request; the first procedure includes resetting MAC.

In one embodiment, the first timer is T301, and the first signal comprises an RRC reestablishment request; the first procedure includes entering RRC_IDLE state.

In one embodiment, when a first condition is fulfilled in the first time window, the first transceiver 1202A stops the first timer; or, when the first condition is not fulfilled in the first time window, the first transceiver 1202A keeps counting of the first timer; when the first timer is T312, the first condition comprises one of the first node initiating connection reestablishment, T310 of a SpCell being expired or an SCG being released; when the first timer is T316, the first condition comprises the first node initiating connection reestablishment; when the first timer is T300, the first condition comprises a higher layer dropping connection reestablishment.

In one embodiment, the phrase that the first timer is expired includes a meaning that running time of the first timer reaches a first threshold, the first threshold is a positive integer, and the first threshold is measured in milliseconds, the first information being used to determine the first threshold.

In one embodiment, the first receiver 1201A comprises at least the first four of the antenna 452, the receiver 454, the multi-antenna receiving processor 458, the receiving processor 456 and the controller/processor 459 in Embodiment 4.

In one embodiment, the first transceiver 1202A comprises at least the first six of the antenna 452, the transmitter/receiver 454, the multi-antenna transmitting processor 457, the transmitting processor 468, the multi-antenna receiving processor 458, the receiving processor 456 and the controller/processor 459 in Embodiment 4.

In one embodiment, the second transceiver 1203A comprises at least the first six of the antenna 452, the transmitter/receiver 454, the multi-antenna transmitting processor 457, the transmitting processor 468, the multi-antenna receiving processor 458, the receiving processor 456 and the controller/processor 459 in Embodiment 4.

Embodiment 12B

Figure 12B:
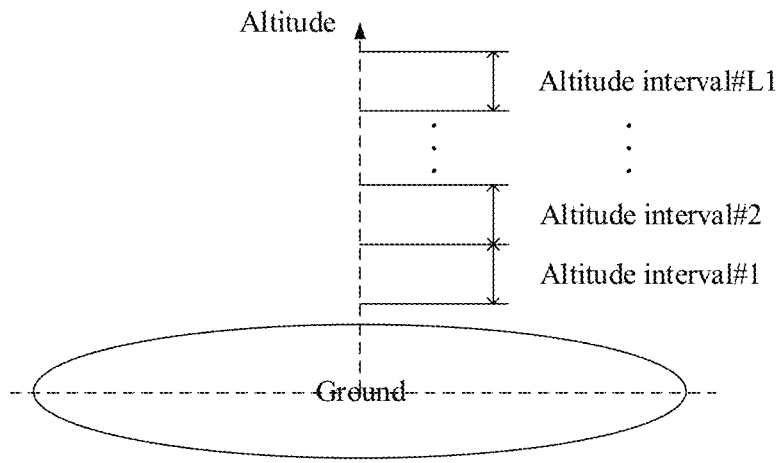
FIG. 12B illustrates a schematic diagram of a first parameter group according to one embodiment of the present disclosure.

Embodiment 12B illustrates a schematic diagram of a first time resource set; as shown in FIG. 12B. In FIG. 12B, the first parameter group comprises information about an altitude of the second node in the present disclosure. The altitude at which the second node is located is within a first altitude interval of L1 altitude intervals, the L1 altitude intervals respectively corresponding to L1 candidate time values, and the first time interval length is equal to a candidate time value of the L1 candidate time values that corresponds to the first altitude interval; L1 is a positive integer greater than 1; and altitude interval #1-altitude interval #L1 illustrated in FIG. 12B respectively correspond to the L1 altitude intervals.

In one embodiment, any of the L1 candidate time values is equal to a positive integer number of (more than one) milliseconds.

In one embodiment, the type of satellite corresponding to the second node is used to determine the first altitude interval where the second node is located.

Embodiment 13A

Figure 13A:
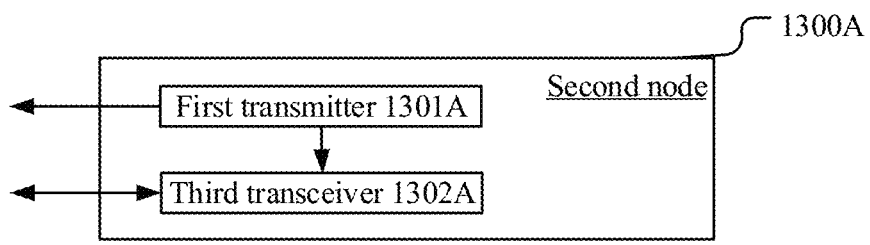
FIG. 13A illustrates a structure block diagram of a processing device in a second node according to one embodiment of the present disclosure.

Embodiment 13A illustrates a structure block diagram of a processing device in a second node, as shown in FIG. 13A. In FIG. 13A, a second node 1300A comprises a first transmitter 1301A and a third transceiver 1302A.

The first transmitter 1301A transmits first information; and the third transceiver 1302A receives a first signal.

In Embodiment 13A, a transmitter of the first signal is a first node, and the first signal is used to trigger a first timer for the first node; when the first timer is expired, the first node triggers a first procedure; the first information is used to determine a first time interval length; the first timer is started in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; the first procedure is related to a type of the first timer.

In one embodiment, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, the third transceiver 1302A transmits a second signal; a transmitter of the first signal is a first node, the first node monitoring a second signal during running of the first timer; the first node successfully receives the second signal during the running of the first timer, and then the first timer stops running.

In one embodiment, the third transceiver 1302A drops transmitting a second signal; a transmitter of the first signal is a first node, the first node monitoring a second signal during running of the first timer; the first node does not receive the second signal successfully before expiration of the first timer, and the first node triggers the first procedure.

In one embodiment, the first timer is T312, and the first signal comprises a measurement report; the first procedure includes one of entering RRC_IDLE state, initiating connection reestablishment, or initiating SCG-failure information.

In one embodiment, the first timer is T316, and the first signal comprises a message of MCG failure information; the first procedure includes initiating connection reestablishment.

In one embodiment, the first timer is T300, and the first signal comprises an RRC setup request; the first procedure includes resetting MAC.

In one embodiment, the first timer is T301, and the first signal comprises an RRC reestablishment request; the first procedure includes entering RRC_IDLE state.

In one embodiment, a transmitter of the first signal is a first node; when a first condition is fulfilled in the first time window, the first node stops the first timer; or, when the first condition is not fulfilled in the first time window, the first node keeps counting of the first timer; when the first timer is T312, the first condition comprises one of the first node initiating connection reestablishment, T310 of a SpCell being expired or an SCG being released; when the first timer is T316, the first condition comprises the first node initiating connection reestablishment; when the first timer is T300, the first condition comprises a higher layer dropping connection reestablishment.

In one embodiment, the phrase that the first timer is expired includes a meaning that running time of the first timer reaches a first threshold, the first threshold is a positive integer, and the first threshold is measured in milliseconds, the first information being used to determine the first threshold.

In one embodiment, the first transmitter 1301A comprises at least the first four of the antenna 420, the transmitter 418, the multi-antenna transmitting processor 471, the transmitting processor 416 and the controller/processor 475 in Embodiment 4.

In one embodiment, the third transceiver 1302A comprises at least the first four of the antenna 420, the transmitter/receiver 418, the multi-antenna transmitting processor 471, the transmitting processor 416, the multi-antenna receiving processor 472, the receiving processor 470 and the controller/processor 475 in Embodiment 4.

Embodiment 13B

Figure 13B:
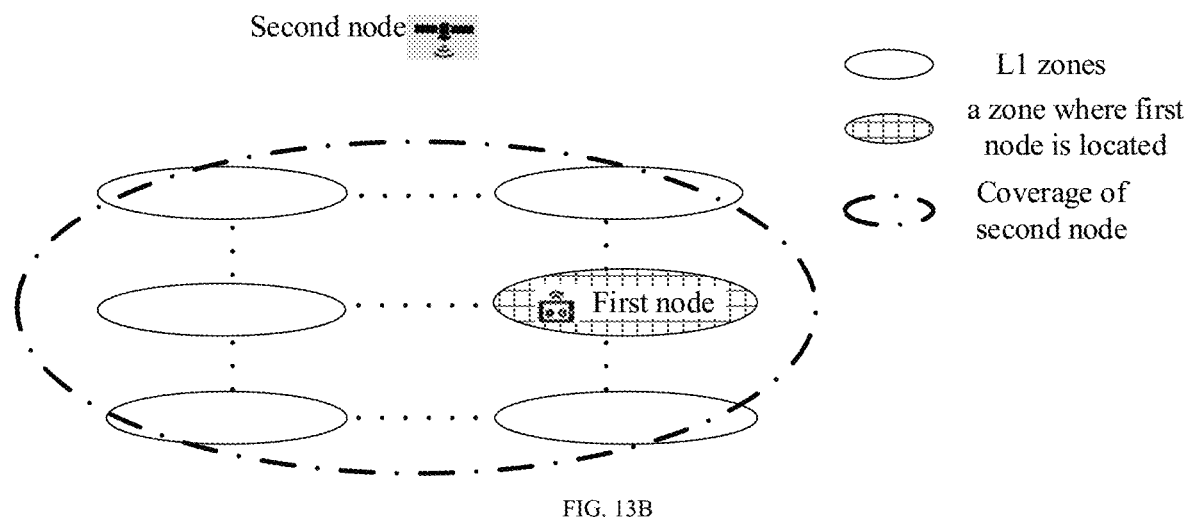
FIG. 13B illustrates a schematic diagram of a first parameter group according to another embodiment of the present disclosure.

Embodiment 13B illustrates another schematic diagram of a first parameter group; as shown in FIG. 13B. In FIG. 13B, the first parameter group comprises an inclination angle of the second node to the first node in the present disclosure. The second node's coverage includes L1 zones, and the L1 zones respectively correspond to L1 candidate inclination angles, the inclination angle of the second node to the first node is a first inclination angle of the L1 candidate inclination angles, the L1 candidate inclination angles respectively corresponding to L1 candidate time values, and the first time interval length is equal to one of the L1 candidate time values corresponding to the first inclination angle; L1 is a positive integer greater than 1; zone #1-zone #L1 illustrated in FIG. 11A respectively correspond to the L1 candidate inclination angles.

In one embodiment, any of the L1 candidate time values is equal to a positive integer number of (more than one) milliseconds.

In one embodiment, a candidate zone where the first node is located is used to determine the first inclination angle.

In one embodiment, the L1 zones respectively correspond to L1 Beams.

In one embodiment, the L1 zones respectively correspond to L1 antenna ports.

In one embodiment, the L1 zones respectively correspond to L1 CSI-RS resources.

In one embodiment, the L1 zones respectively correspond to L1 SSB resources.

Embodiment 14

Figure 14:
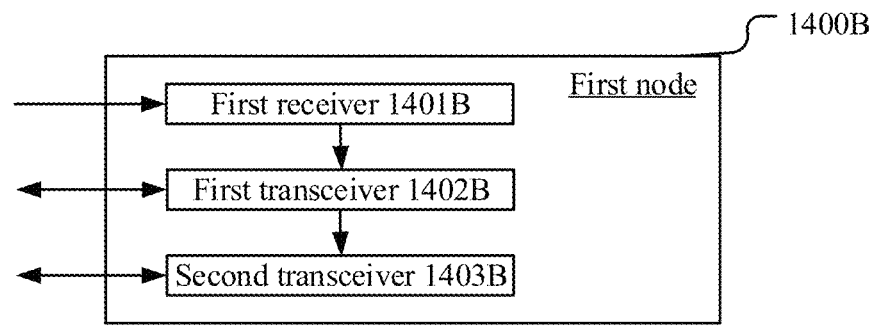
FIG. 14 illustrates a structure block diagram of a processing device in a first node according to one embodiment of the present disclosure.

Embodiment 14 illustrates a structure block diagram of a processing device in a first node, as shown in FIG. 14 In FIG. 14, a first node 1400B comprises a first receiver 1401B, a first transceiver 1402B and a second transceiver 1403B.

The first receiver 1401B receives first information;

the first transceiver 1402B receives a first signal and triggers a first timer; and the second transceiver 1403B determines that the first timer is expired and triggers a first procedure.

In Embodiment 14, the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, the first timer is T304; the first signal comprises RRCReconfiguration with reconfigurationWith-Sync, or the first signal comprises Conditional Reconfiguration Execution; the first procedure includes one of initiating RRC reestablishment, reference source RAT protocols implementation or initiating SCG-failure information.

In one embodiment, the first timer is T316, and the first signal comprises a message of MCG failure information; the first procedure includes initiating connection reestablishment.

In one embodiment, the first transceiver 1402B monitors a second signal during running of the first timer; the first node successfully receives the second signal during the running of the first timer, and the first timer stops running; or the first node does not receive the second signal successfully before expiration of the first timer, and the first node triggers the first procedure.

In one embodiment, when a first condition is fulfilled in the first time resource set, the first transceiver 1402B stops the first timer; or, when a first condition is not fulfilled in the first time resource set, the first transceiver 1402B keeps counting of the first timer; when the first timer is T304, the first condition includes the first node successfully completing random access, or the first condition includes an SCG being released; when the first timer is T316, the first condition includes the first node initiating connection reestablishment.

In one embodiment, the first transceiver 1402B transmits K1 second-type signals respectively in K1 second-type time windows, and the first transceiver 1402B receives K1 first-type signals respectively in the K1 first-type time windows; the K1 second-type time windows respectively correspond to the K1 first-type time windows, and the K1 first-type signals are respectively used for feedbacks of the K1 second-type signals; at least one of the K1 second-type signals is used for random access, and at least one of the K1 first-type signals is used for feedback of random access.

In one embodiment, the phrase that the first timer is expired includes a meaning that running time of the first timer reaches a first threshold, the first threshold is a positive integer, and the first threshold is measured in milliseconds, the first information being used to determine the first threshold.

In one embodiment, radio link monitoring is not performed within a time interval between an end time of reception of the first signal and a start time of the first time resource set.

In one embodiment, the first receiver 1401B comprises at least the first four of the antenna 452, the receiver 454, the multi-antenna receiving processor 458, the receiving processor 456 and the controller/processor 459 in Embodiment 4.

In one embodiment, the first transceiver 1402B comprises at least the first six of the antenna 452, the transmitter/receiver 454, the multi-antenna transmitting processor 457, the transmitting processor 468, the multi-antenna receiving processor 458, the receiving processor 456 and the controller/processor 459 in Embodiment 4.

In one embodiment, the second transceiver 1403B comprises at least the first six of the antenna 452, the transmitter/receiver 454, the multi-antenna transmitting processor 457, the transmitting processor 468, the multi-antenna receiving processor 458, the receiving processor 456 and the controller/processor 459 in Embodiment 4.

Embodiment 15

Figure 15:
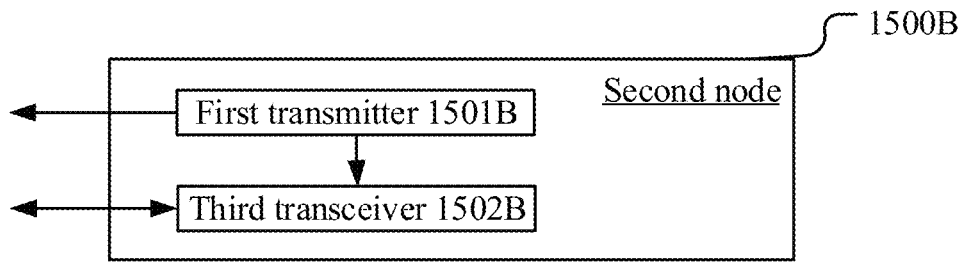
FIG. 15 illustrates a structure block diagram of a processing device in a second node according to one embodiment of the present disclosure.

Embodiment 15 illustrates a structure block diagram of a processing device in a second node, as shown in FIG. 15. In FIG. 15, a second node 1500B comprises a first transmitter 1501B and the third transceiver 1502B.

The first transmitter 1501B transmits first information; and the third transceiver 1502B transmits a first signal.

In Embodiment 15, a receiver of the first information includes a first node, and the first signal is used for initiating a first timer of the first node; the first information is used to determine a first time interval length; the first timer is only started in a first time resource set, and the first time resource set comprises K1 first-type time windows, any of the K1 first-type time windows comprising a positive integer number of consecutive slots; a time interval between any two time-domain adjacent first-type time windows of the K1 first-type time windows is no smaller than the first time interval length; the first timer and the first procedure are both used for radio link management, or the first timer and the first procedure are both used for radio resource management; K1 is a positive integer greater than 1.

In one embodiment, the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

In one embodiment, the first timer is T304; the first signal comprises RRCReconfiguration with reconfigurationWithSync, or the first signal comprises Conditional Reconfiguration Execution; the first procedure includes one of initiating RRC reestablishment, reference source RAT protocols implementation or initiating SCG-failure information.

In one embodiment, the first timer is T316, and the first signal comprises a message of MCG failure information; the first procedure includes initiating connection reestablishment.

In one embodiment, the third transceiver 1502B transmits a second signal; a receiver of the first signal includes a first node, and the first node monitors a second signal during running of the first timer; the first node successfully receives the second signal during the running of the first timer, and then the first timer stops running.

In one embodiment, the third transceiver 1502B drops transmitting a second signal; a receiver of the first signal includes a first node, and the first node monitors a second signal during running of the first timer; the first node does not receive the second signal successfully before expiration of the first timer, and the first node triggers the first procedure.

In one embodiment, a receiver of the first signal includes a first node, when a first condition is fulfilled in the first time resource set, the first node stops the first timer; or, when a first condition is not fulfilled in the first time resource set, the first node keeps counting of the first timer; when the first timer is T304, the first condition includes the first node successfully completing random access, or the first condition includes an SCG being released; when the first timer is T316, the first condition includes the first node initiating connection reestablishment.

In one embodiment, the third transceiver 1502B receives K1 second-type signals respectively in K1 second-type time windows; and the third transceiver 1502B transmits K1 first-type signals respectively in the K1 first-type time windows; the K1 second-type time windows respectively correspond to the K1 first-type time windows, and the K1 first-type signals are respectively used for feedbacks of the K1 second-type signals; at least one of the K1 second-type signals is used for random access, and at least one of the K1 first-type signals is used for feedback of random access.

In one embodiment, the phrase that the first timer is expired includes a meaning that running time of the first timer reaches a first threshold, the first threshold is a positive integer, and the first threshold is measured in milliseconds, the first information being used to determine the first threshold.

In one embodiment, a receiver of the first signal includes a first node, and the first node does not perform radio link monitoring during a time interval between an end time of reception of the first signal and a start time of the first time resource set.

In one embodiment, the first transmitter 1501B comprises at least the first four of the antenna 420, the transmitter 418, the multi-antenna transmitting processor 471, the transmitting processor 416 and the controller/processor 475 in Embodiment 4.

In one embodiment, the third transceiver 1502B comprises at least the first four of the antenna 420, the transmitter/receiver 418, the multi-antenna transmitting processor 471, the transmitting processor 416, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, aircrafts, droners, telecontrolled diminutive airplanes, etc. The base station in the present disclosure includes but is not limited to macro-cellular base stations, micro-cellular base stations, home base stations, relay base station, eNB, gNB, Transmitter Receiver Point (TRP), GNSS, relay satellite, satellite base station, airborne base station and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
a first receiver, receiving first information, wherein the first information is used to determine a first time interval length;
a first transceiver, transmitting a first signal and triggering a first timer,
wherein the first timer is started in a first time window, the first time window comprising a positive integer number of consecutive slots; a time interval between an end time of transmission of the first signal and a start of the first time window is equal to the first time interval length; and
a second transceiver, determining that the first timer is expired and triggering a first procedure, wherein the first procedure is related to a type of the first timer.

2. The first node according to claim 1, wherein the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information; and wherein the first timer and the first procedure are both used for radio link management, or the first time and the first procedure are both used for radio resource management.

3. The first node according to claim 1, wherein the first transceiver monitors a second signal during running of the first timer; the first node successfully receives the second signal during the running of the first timer, and then the first timer stops running; or the first node does not receive the second signal successfully before expiration of the first timer, and the first node triggers the first procedure.

4. The first node according to claim 1, wherein the first timer is T312, and the first signal comprises a measurement report; and the first procedure comprises one of entering radio resource control (RRC) Idle state, initiating connection reestablishment or initiating secondary cell group (SCG) failure information.

5. The first node according to claim 1, wherein the first timer is T316, and the first signal comprises a message of master cell group (MCG) failure information; and the first procedure comprises initiating connection reestablishment.

6. The first node according to claim 1, wherein the first timer is T300, and the first signal comprises an RRC setup request; and the first procedure comprises reconfiguring medium access control (MAC).

7. The first node according to claim 1, wherein the first timer is T301, and the first signal comprises an RRC reestablishment request; and the first procedure comprises entering RRC Idle state.

8. The first node according to claim 4, wherein when a first condition is fulfilled in the first time window, the first transceiver stops the first timer; or, when the first condition is not fulfilled in the first time window, the first transceiver keeps counting of the first timer; when the first timer is T312, the first condition comprises one of the first node initiating connection reestablishment, T310 of a SpCell being expired or an SCG being released; when the first timer is T316, the first condition comprises the first node initiating connection reestablishment; and when the first timer is T300, the first condition comprises a higher layer dropping connection reestablishment.

9. The first node according to claim 1, wherein the determination that the first timer is expired includes a determination that a running period of the first timer reaches a first threshold, the first threshold is a positive integer, the first threshold is measured in milliseconds (ms), the first information is used to determine the first threshold.

10. The first node according to claim 9, wherein the first threshold is one of Q1 candidate thresholds, and the Q1 candidate thresholds respectively correspond to Q1 satellite types, a transmitter of the first information is a second node, and a type of the second node is one of the Q1 satellite types, and the type of the second node is used to determine the first threshold from the Q1 candidate thresholds; and Q1 is a positive integer greater than 1.

11. The first node according to claim 9, wherein the first threshold is one of Q1 candidate thresholds, and the Q1 candidate thresholds respectively correspond to Q1 altitude intervals, a transmitter of the first information is a second node, and an altitude interval where the second node is located is one of the Q1 altitude intervals, and the altitude interval where the second node is located is used to determine the first threshold from the Q1 candidate thresholds; and Q1 is a positive integer greater than 1.

12. A second node for wireless communications, comprising:
a first transmitter, transmitting first information; and
a third transceiver, receiving a first signal, from a first node; wherein the first signal is for triggering a first timer for the first node; expiration of the first timer is for the first node to trigger a first procedure; the first information for determining a first time interval length; the first timer is for starting in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; and the first procedure is related to a type of the first timer.

13. The second node according to claim 12, wherein the first information is used to determine a first parameter group, and the first parameter group is used to determine the first time interval length, the first parameter group comprising at least one of a type corresponding to a transmitter of the first information, an altitude of the transmitter of the first information, a running speed or a running direction of the transmitter of the first information.

14. The second node according to claim 12, wherein the third transceiver transmits a second signal; a transmitter of the first signal is a first node, the first node monitoring a second signal during running of the first timer; and the first node successfully receives the second signal during the running of the first timer, and then the first timer stops running.

15. The second node according to claim 12, wherein the third transceiver drops transmitting a second signal; a transmitter of the first signal is a first node, the first node monitoring a second signal during running of the first timer; and the first node does not receive the second signal successfully before expiration of the first timer, and the first node triggers the first procedure.

16. The second node according to claim 12, wherein the first timer is T312, and the first signal comprises a measurement report; and the first procedure comprises one of entering radio resource control (RRC) Idle state, initiating connection reestablishment or initiating secondary cell group (SCG) failure information.

17. The second node according to claim 12, wherein the first timer is T316, and the first signal comprises a message of master cell group (MCG) failure information; and the first procedure comprises initiating connection reestablishment.

18. The second node according to claim 12, wherein the first timer is T300, and the first signal comprises an RRC setup request; and the first procedure comprises reconfiguring medium access control (MAC); or wherein the first timer is T301, and the first signal comprises an RRC reestablishment request; and the first procedure comprises entering RRC Idle state.

19. A method in a first node for wireless communications, comprising:
receiving first information, wherein the first information is used to determine a first time interval length;
transmitting a first signal and triggering a first timer, wherein the first timer is started in a first time window, the first time window comprising a positive integer number of consecutive slots; a time interval between an end time of transmission of the first signal and a start of the first time window is equal to the first time interval length; and
determining that a first timer is expired and triggering a first procedure, wherein the first procedure is related to a type of the first timer.

20. A method in a second node for wireless communications, comprising:
transmitting first information; and
receiving a first signal, from a first node; wherein the first signal is for triggering a first timer for the first node; expiration of the first timer is, for the first node to trigger a first procedure; the first information for determining a first time interval length; the first timer is for starting in a first time window, the first time window comprising a positive integer number of consecutive slots; a time interval between an end time of transmission of the first signal and a start of the first time window is equal to the first time interval length; the first timer and the first procedure are both used for radio link management, or the first timer and the first procedure are both used for radio resource management; and the first procedure is related to a type of the first timer.

* * * * *